(12) United States Patent
Abotabl et al.

(10) Patent No.: US 12,309,104 B2
(45) Date of Patent: May 20, 2025

(54) DETERMINING A SUB-BAND SIZE FOR CHANNEL STATE INFORMATION REPORTING BASED ON AN ACTIVE ANTENNA PORT CONFIGURATION

(71) Applicant: QUALCOMM Incorporated, San Diego, CA (US)

(72) Inventors: Ahmed Attia Abotabl, San Diego, CA (US); Hung Dinh Ly, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 363 days.

(21) Appl. No.: 17/894,708

(22) Filed: Aug. 24, 2022

(65) Prior Publication Data

US 2024/0072978 A1    Feb. 29, 2024

(51) Int. Cl.
*H04L 5/00* (2006.01)
*H04B 7/0456* (2017.01)
*H04W 72/20* (2023.01)

(52) U.S. Cl.
CPC ......... *H04L 5/0092* (2013.01); *H04B 7/0456* (2013.01); *H04L 5/0048* (2013.01); *H04L 5/0057* (2013.01); *H04W 72/20* (2023.01)

(58) Field of Classification Search
CPC ... H04L 5/0092; H04L 5/0048; H04L 5/0057; H04L 5/0051; H04B 7/0456;

(Continued)

(56) References Cited

U.S. PATENT DOCUMENTS

2010/0222008 A1* 9/2010 Astely ............... H04B 7/066
                                                    455/67.11
2015/0078284 A1* 3/2015 Lee ................... H04L 1/0026
                                                    370/329

(Continued)

FOREIGN PATENT DOCUMENTS

CN    110351832 A   * 10/2019
CN    116746193 A   *  9/2023   ........... H04B 7/0617
WO  WO-2021087844 A1    5/2021

OTHER PUBLICATIONS

International Search Report and Written Opinion—PCT/US2023/028211—ISA/EPO—Nov. 6, 2023.

*Primary Examiner* — Mohamed A Kamara
(74) *Attorney, Agent, or Firm* — Kevin M. Donnelly; Holland & Hart LLP

(57) ABSTRACT

Methods, systems, and devices for wireless communications are described. In some systems, a user equipment (UE) may use a mapping to update channel state information (CSI) reporting granularity based on an antenna port configuration update. For example, the UE may store a mapping from different antenna port configurations to respective sub-band sizes for CSI reporting. In some examples, a network entity may configure the UE with the mapping. In some other examples, the UE may be pre-configured with the mapping. If the UE receives control signaling, such as downlink control information (DCI) signaling, indicating an antenna port configuration update at the network entity, the UE may use the mapping to determine a corresponding update to sub-band size granularity for CSI reporting. The UE may use the determined sub-band size for performing CSI measurements on reference signals and reporting the CSI measurements in a CSI report to the network entity.

30 Claims, 17 Drawing Sheets

(58) Field of Classification Search
CPC .... H04B 7/0478; H04B 7/0626; H04B 7/066;
H04B 7/0417; H04B 7/04; H04B 7/06;
H04W 72/20
See application file for complete search history.

(56) References Cited

U.S. PATENT DOCUMENTS

| | | |
|---|---|---|
| 2017/0222768 A1 | 8/2017 | Lee et al. |
| 2020/0022120 A1* | 1/2020 | Liu ...................... H04B 7/0473 |
| 2020/0112355 A1* | 4/2020 | Park ..................... H04L 5/0094 |

* cited by examiner

DETERMINING A SUB-BAND SIZE FOR CHANNEL STATE INFORMATION REPORTING BASED ON AN ACTIVE ANTENNA PORT CONFIGURATION

TECHNICAL FIELD

The following relates to wireless communications, including determining a sub-band size for channel state information (CSI) reporting based on an active antenna port configuration.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a network entity, such as a base station or radio unit (RU), may include a relatively large quantity of antenna ports to support massive multiple-input, multiple-output (MIMO) communications, among other implementations. Operating using the relatively large quantity of antenna ports, however, may result in a correspondingly high network energy consumption (for example, greater than an energy overhead threshold) for a radio access network (RAN). This high network energy consumption by the RAN may potentially limit an adoption and an expansion of cellular networks, for example, for massive-MIMO communications.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method includes receiving, from a network entity, a control signal indicating an updated antenna port configuration for the network entity and receiving, from the network entity, a set of multiple reference signals based on the updated antenna port configuration and on an association between the updated antenna port configuration and a sub-band size for reporting channel state information (CSI). The method further includes transmitting, to the network entity, a CSI report including CSI measurements, the CSI measurements based on the sub-band size and the set of multiple reference signals.

Another innovative aspect of the subject matter described in this disclosure can be implemented in an apparatus for wireless communications at a UE. The apparatus includes a processor and memory coupled with the processor. The memory stores instructions executable by the processor to cause the apparatus to receive, from a network entity, a control signal indicating an updated antenna port configuration for the network entity and receive, from the network entity, a set of multiple reference signals based on the updated antenna port configuration and on an association between the updated antenna port configuration and a sub-band size for reporting CSI. The memory stores instructions further executable by the processor to cause the apparatus to transmit, to the network entity, a CSI report including CSI measurements, the CSI measurements based on the sub-band size and the set of multiple reference signals.

Another innovative aspect of the subject matter described in this disclosure can be implemented in an apparatus for wireless communications at a UE. The apparatus includes means for receiving, from a network entity, a control signal indicating an updated antenna port configuration for the network entity and means for receiving, from the network entity, a set of multiple reference signals based on the updated antenna port configuration and on an association between the updated antenna port configuration and a sub-band size for reporting CSI. The apparatus further includes means for transmitting, to the network entity, a CSI report including CSI measurements, the CSI measurements based on the sub-band size and the set of multiple reference signals.

Another innovative aspect of the subject matter described in this disclosure can be implemented in a non-transitory computer-readable medium storing code for wireless communications at a UE. The code includes instructions executable by a processor to receive, from a network entity, a control signal indicating an updated antenna port configuration for the network entity and receive, from the network entity, a set of multiple reference signals based on the updated antenna port configuration and on an association between the updated antenna port configuration and a sub-band size for reporting CSI. The code includes instructions further executable by the processor to transmit, to the network entity, a CSI report including CSI measurements, the CSI measurements based on the sub-band size and the set of multiple reference signals.

Another innovative aspect of the subject matter described in this disclosure can be implemented in a method for wireless communications at a network entity. The method includes transmitting a control signal indicating an updated antenna port configuration for the network entity and transmitting a set of multiple reference signals based on the updated antenna port configuration and on an association between the updated antenna port configuration and a sub-band size for a CSI report. The method further includes receiving the CSI report including CSI measurements, the CSI measurements based on the sub-band size and the set of multiple reference signals.

Another innovative aspect of the subject matter described in this disclosure can be implemented in an apparatus for wireless communications at a network entity. The apparatus includes a processor and memory coupled with the processor. The memory stores instructions executable by the processor to cause the apparatus to transmit a control signal indicating an updated antenna port configuration for the network entity and transmit a set of multiple reference signals based on the updated antenna port configuration and on an association between the updated antenna port configuration and a sub-band size for a CSI report. The memory stores instructions further executable by the processor to cause the apparatus to receive the CSI report including CSI measurements, the CSI measurements based on the sub-band size and the set of multiple reference signals.

Another innovative aspect of the subject matter described in this disclosure can be implemented in an apparatus for wireless communications at a network entity. The apparatus includes means for transmitting a control signal indicating an updated antenna port configuration for the network entity and means for transmitting a set of multiple reference signals based on the updated antenna port configuration and on an association between the updated antenna port configuration and a sub-band size for a CSI report. The apparatus further includes means for receiving the CSI report including CSI measurements, the CSI measurements based on the sub-band size and the set of multiple reference signals.

Another innovative aspect of the subject matter described in this disclosure can be implemented in a non-transitory computer-readable medium storing code for wireless communications at a network entity. The code includes instructions executable by a processor to transmit a control signal indicating an updated antenna port configuration for the network entity and transmit a set of multiple reference signals based on the updated antenna port configuration and on an association between the updated antenna port configuration and a sub-band size for a CSI report. The code includes instructions further executable by the processor to receive the CSI report including CSI measurements, the CSI measurements based on the sub-band size and the set of multiple reference signals.

DETAILED DESCRIPTION

Figure 1:
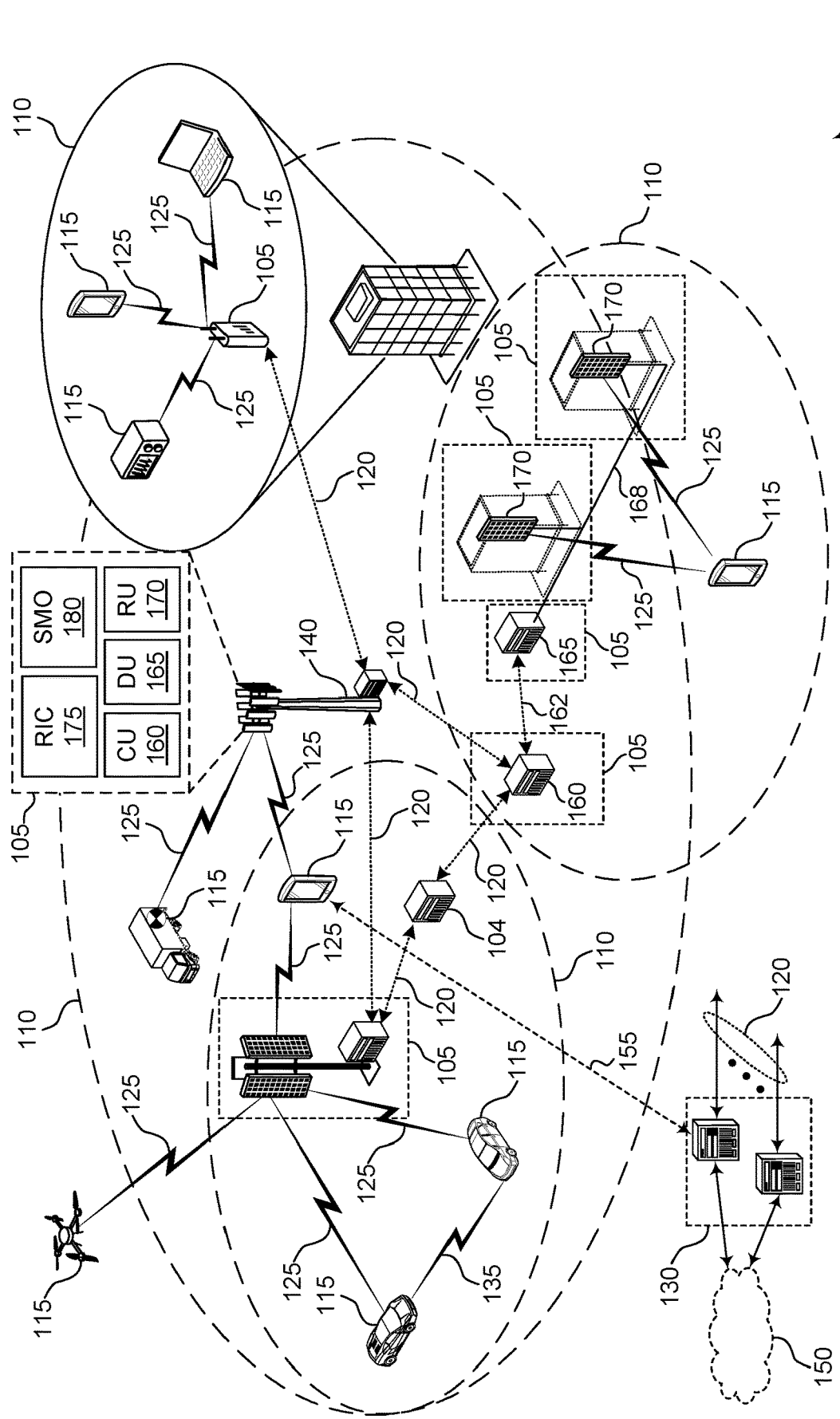
FIG. 1 illustrates an example of a wireless communications system that supports determining a sub-band size for channel state information (CSI) reporting based on an active antenna port configuration in accordance with one or more aspects of the present disclosure.

In some wireless communications systems, a network entity may dynamically update (or "adapt") an antenna port configuration to support power savings. For example, the network entity may deactivate a quantity of antenna ports to conserve energy or may activate a quantity of antenna ports to support connections with one or more additional wireless devices, such as user equipments (UEs). The network entity may transmit an indication of an antenna port configuration update (or "change") to a UE via signaling, such as downlink control information (DCI) signaling, medium access control (MAC) control element (CE) signaling, or other control signaling, such that the UE may communicate with the network entity according to the updated antenna port configuration. An update to the antenna port configuration at the network entity, however, may also affect channel state information (CSI) reporting by the UE. The CSI reporting by the UE may be based on CSI reporting parameters configured by the network entity using other control signaling, such as radio resource control (RRC) signaling. Because DCI signaling supports relatively lower-latency communication than RRC signaling, the network entity can dynamically update the antenna port configuration of the network entity according to a relatively shorter timeline than the network entity can reconfigure CSI reporting parameters using RRC signaling.

Various aspects generally relate to CSI reporting, and more specifically, to determining a sub-band size for CSI reporting based on an active antenna port configuration. The sub-band size may determine a granularity for CSI reporting, such that a CSI report includes CSI measurement values corresponding to respective sub-bands of the sub-band size. A UE may use a mapping to determine the sub-band size for CSI reporting that corresponds to an active antenna port configuration at a network entity. If the network entity updates the active antenna port configuration and indicates the updated active antenna port configuration to the UE, the UE may correspondingly update the sub-band size for CSI reporting according to the mapping. For example, the UE may store a mapping between respective antenna port configurations and respective sub-band sizes for CSI reporting. In some examples, the mapping may more specifically map respective active quantities of antenna ports to respective sub-band sizes. In some other examples, the mapping may more specifically map respective types of antenna port configurations (for example, a main antenna port configuration, one or more secondary antenna port configurations) to respective sub-band sizes. In yet some other examples, the UE may use a scaling operation to determine the mapping from respective antenna port configurations to respective sub-band sizes. The sub-band sizes for CSI reporting indicated by the mapping may be the same or different for channel quality information (CQI) reporting and precoding matrix indicator (PMI) reporting, among other implementations. In some examples, the network entity may configure the UE with the mapping, the scaling operation, or both (for example, via RRC signaling). In such examples, if the UE receives a control signal (for example, DCI signaling) indicating an antenna port configuration update at the network entity, the UE may use the mapping to determine a corresponding update to a sub-band size for CSI reporting. The UE may use the determined sub-band size for CSI reporting, including performing CSI measurements on CSI reference signals (CSI-RSs) and determining the granularity for reporting CSI measurements, such as CQI, PMI, or both (among other parameters), in a CSI report the UE transmits to the network entity. In some examples, the granularity of the CSI reporting may be based on the sub-band size, such that the CSI report includes multiple CSI measurement values, and each CSI measurement value corresponds to a bandwidth of the determined sub-band size.

Particular aspects of the subject matter described in this disclosure may be implemented to realize one or more of the following potential advantages. By using the mapping from different antenna port configurations to respective sub-band sizes for CSI reporting, a UE is able to dynamically update a sub-band size for CSI reporting (for example, CSI-RS reception, CSI measurements, and determination of a granularity of CSI reporting, such as PMI reporting, CQI reporting, or both) in response to a dynamic update of an antenna port configuration performed by a network entity. The UE is enabled to update the granularity of CSI reporting without an RRC reconfiguration of the CSI reporting parameters, thereby improving the latency and reducing the signaling overhead associated with updating the granularity of the CSI reporting, among other benefits. Such updates to the granularity of the CSI reporting based on the mapping may also improve CSI reporting accuracy by the UE. For example, if the network entity decreases a quantity of active antenna ports, the mapping may allow the UE to correspondingly increase a sub-band size for CSI reporting, reducing the processing and signaling overheads associated with CSI reporting, reconfiguration of CSI reporting parameters, or both while maintaining a CSI reporting accuracy (for example, satisfying an accuracy threshold) according to the updated quantity of active antenna ports. Additionally, or alternatively, if the network entity increases the quantity of active antenna ports, the mapping may allow the UE to correspondingly decrease a sub-band size for CSI reporting, supporting relatively more granular CSI reporting and, correspondingly, relatively more accurate precoding for communications between the UE and the network entity according to the updated quantity of active antenna ports.

Aspects of the disclosure are initially described in the context of wireless communications systems. Aspects of the disclosure are further illustrated by and described with reference to process flows, apparatus diagrams, system diagrams, and flowcharts that relate to sub-band sizes for CSI reporting based on antenna port configuration adaptation.

FIG. 1 illustrates an example of a wireless communications system 100 that supports determining a sub-band size for CSI reporting based on an active antenna port configuration in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (for example, a radio frequency (RF) access link). For example, a network entity 105 may support a coverage area 110 (for example, a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 may be capable of supporting communications with various types of devices, such as other UEs 115 or network entities 105, as shown in FIG. 1.

A node of the wireless communications system 100, which may be referred to as a network node, or a wireless node, may be a network entity 105, a UE 115, a network controller, an apparatus, a device, a computing system, one or more components, or another suitable processing entity. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, or computing system may include disclosure of the UE 115, network entity 105, apparatus, device, or computing system being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (for example, in accordance with an S1, N2, N3, or other interface protocol). In some examples, network entities 105 may communicate with one another via a backhaul communication link 120 (for example, in accordance with an X2, Xn, or other interface protocol) either directly (for example, directly between network entities 105) or indirectly (for example, via a core network 130). In some examples, network entities 105 may communicate with one another via a midhaul communication link 162 (for example, in accordance with a midhaul interface protocol) or a fronthaul communication link 168 (for example, in accordance with a fronthaul interface protocol), or any combination thereof. The backhaul communication links 120, midhaul communication links 162, or fronthaul communication links 168 may be or include one or more wired links (for example, an electrical link, an optical fiber link), one or more wireless links (for example, a radio link, a wireless optical link), among other examples or various combinations thereof. A UE 115 may communicate with the core network 130 via a communication link 155.

One or more of the network entities 105 may include or may be referred to as a base station 140 (for example, a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (for example, a base station 140) may be implemented in an aggregated (for example, monolithic, standalone) base station architecture, which may be configured to utilize a protocol stack that is physically or logically integrated within a single network entity 105 (for example, a single RAN node, such as a base station 140).

In some examples, a network entity 105 may be implemented in a disaggregated architecture (for example, a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (for example, a network configuration sponsored by the O-RAN Alliance), or a virtualized RAN (vRAN) (for example, a cloud RAN (C-RAN)). For example, a network entity 105 may include one or more of a central unit (CU) 160, a distributed unit (DU) 165, a radio unit (RU) 170, a RAN Intelligent Controller (MC) 175 (for example, a Near-Real Time MC (Near-RT MC), a Non-Real Time MC (Non-RT MC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (for example, separate physical locations). In some examples, one or more network entities 105 of a disaggregated RAN architecture may be implemented as virtual units (for example, a virtual CU (VCU), a virtual DU (VDU), a virtual RU (VRU)).

The split of functionality between a CU 160, a DU 165, and an RU 170 is flexible and may support different functionalities depending on which functions (for example, network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (for example, layer 3 (L3), layer 2 (L2)) functionality and signaling (for example, Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (for example, physical (PHY) layer) or L2 (for example, radio link control (RLC) layer, MAC layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (for example, via one or more RUs 170). In some implementations, a functional split between a CU 160 and a DU 165, or between a DU 165 and an RU 170 may be within a protocol layer (for example, some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (for example, F1, F1-c, F1-u), and a DU 165 may be connected to one or more RUs 170 via a fronthaul communication link 168 (for example, open fronthaul (FH) interface). In some examples, a midhaul communication link 162 or a fronthaul communication link 168 may be implemented in accordance with an interface (for example, a channel) between layers of a protocol stack supported by respective network entities 105 that are in communication via such communication links.

In wireless communications systems (for example, wireless communications system 100), infrastructure and spectral resources for radio access may support wireless backhaul link capabilities to supplement wired backhaul connections, providing an IAB network architecture (for example, to a core network 130). In some implementations, in an IAB network, one or more network entities 105 (for example, IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (for example, a donor base station 140). The one or more donor network entities 105 (for example, IAB donors) may be in communication with one or more additional network entities 105 (for example, IAB nodes 104) via supported access and backhaul links (for example, backhaul communication links 120). IAB nodes 104 may include an IAB mobile termination (IAB-MT) controlled (for example, scheduled) by DUs 165 of a coupled IAB donor. An IAB-MT may include an independent set of antennas for relay of communications with UEs 115, or may share the same antennas (for example, of an RU 170) of an IAB node 104 used for access via the DU 165 of the IAB node 104 (for example, referred to as virtual IAB-MT (vIAB-MT)). In some examples, the IAB nodes 104 may include DUs 165 that support communication links with additional entities (for example, IAB nodes 104, UEs 115) within the relay chain or configuration of the access network (for example, downstream). In such implementations, one or more components of the disaggregated RAN architecture (for example, one or more IAB nodes 104 or components of IAB nodes 104) may be configured to operate according to the techniques supporting sub-band size determination for CSI reporting.

One or more components of the disaggregated RAN architecture may be configured to support determining sub-band sizes for CSI reporting based on antenna port configuration adaptation. For example, some operations described as being performed by a UE 115 or a network entity 105 (for example, a base station 140) may additionally, or alternatively, be performed by one or more components of the disaggregated RAN architecture (for example, IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (for example, an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (for example, entity, sub-entity) of a network entity 105. For example, the terms "transmitting," "receiving," or "communicating," when referring to a network entity 105, may refer to any portion of a network entity 105 (for example, a base station 140, a CU 160, a DU 165, a RU 170) of a RAN communicating with another device (for example, directly or via one or more other network entities 105).

In some examples, such as in a carrier aggregation configuration, a carrier may also have acquisition signaling or control signaling that coordinates operations for other carriers. A carrier may be associated with a frequency channel (for example, an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (for example, of the same or a different radio access technology).

The communication links 125 shown in the wireless communications system 100 may include downlink transmissions (for example, forward link transmissions) from a network entity 105 to a UE 115, uplink transmissions (for example, return link transmissions) from a UE 115 to a network entity 105, or both, among other configurations of transmissions. Carriers may carry downlink or uplink communications (for example, in an FDD mode) or may be configured to carry downlink and uplink communications (for example, in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (for example, 1.4, 3, 5, 10, 15, 20, 40, or 80 megahertz (MHz)). Devices of the wireless communications system 100 (for example, the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (for example, a sub-band, a BWP) or all of a carrier bandwidth.

Signal waveforms transmitted via a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (for example, a duration of one modulation symbol) and one subcarrier, in which case the symbol period and subcarrier spacing may be inversely related. The quantity of bits carried by each resource element may depend on the modulation scheme (for example, the order of the modulation scheme, the coding rate of the modulation scheme, or both), such that a relatively higher quantity of resource elements (for example, in a transmission duration) and a relatively higher order of a modulation scheme may correspond to a relatively higher rate of communication. A wireless communications resource may refer to a combination of an RF spectrum resource, a time resource, and a spatial resource (for example, a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively-numbered subframes or slots, and each subframe or slot may have the same duration. In some examples, a frame may be divided (for example, in the time domain) into subframes, and each subframe may be further divided into a quantity of slots. Alternatively, each frame may include a variable quantity of slots, and the quantity of slots may depend on subcarrier spacing. Each slot may include a quantity of symbol periods (for example, depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (for example, N f) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, a quantity of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a set of symbol periods and may extend across the system bandwidth or a portion of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (for example, a base station 140, an RU 170) may be movable and provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (for example, in accordance with a peer-to-peer (P2P), D2D, or sidelink protocol). In some examples, one or more UEs 115 of a group that are performing D2D communications may be within the coverage area 110 of a network entity 105 (for example, a base station 140, an RU 170), which may support aspects of such D2D communications being configured by (for example, scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include a control plane entity that manages access and mobility (for example, a mobility management entity (MME), an access and mobility management function (AMF)) and a user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (for example, base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (for example, less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (for example, LAA). Operations using unlicensed spectrum may include downlink transmissions, uplink transmissions, P2P transmissions, or D2D transmissions, among other examples.

A network entity 105 (for example, a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (for example, the same codeword) or different data streams (for example, different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (for example, a network entity 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A network entity 105 or a UE 115 may use beam sweeping techniques as part of beamforming operations. For example, a network entity 105 (for example, a base station 140, an RU 170) may use multiple antennas or antenna arrays (for example, antenna panels) to conduct beamforming operations for directional communications with a UE 115. Some signals (for example, synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (for example, by a transmitting device, such as a network entity 105, or by a receiving device, such as a UE 115) a beam direction for later transmission or reception by the network entity 105.

Some signals, such as data signals associated with a particular receiving device, may be transmitted by transmitting device (for example, a transmitting network entity 105, a transmitting UE 115) along a single beam direction (for example, a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (for example, by a network entity 105 or a UE 115) may be performed using multiple beam directions, and the device may use a combination of digital precoding or beamforming to generate a combined beam for transmission (for example, from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (for example, a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted along one or more directions by a network entity 105 (for example, a base station 140, an RU 170), a UE 115 may employ similar techniques for transmitting signals multiple times along different directions (for example, for identifying a beam direction for subsequent transmission or reception by the UE 115) or for transmitting a signal along a single direction (for example, for transmitting data to a receiving device).

A receiving device (for example, a UE 115) may perform reception operations in accordance with multiple receive configurations (for example, directional listening) when receiving various signals from a receiving device (for example, a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned along a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority management and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (for example, a communication link 125, a D2D communication link 135). HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A network entity 105 in the wireless communications system 100 may transmit a CSI report configuration to a UE 115. The CSI report configuration, which may be transmitted, for example via an RRC signal, may indicate a CSI reporting setting for the UE 115. In some examples, the CSI report configuration may be RRC configured specific to each BWP. The CSI report configuration may configure one or more resource sets for CSI measurement (for example, channel measurement, interference measurement), a codebook configuration (for example, a codebook type, an antenna configuration), a report configuration type (for example, periodic, semi-periodic, aperiodic), or any combination thereof. A resource set indicated by the CSI report configuration may include K s resources with a same quantity of ports, which may be referred to as antenna ports or CSI-RS ports. In some examples, the value of K s may indicate a threshold quantity of ports. For example, if $K_S=1$, each resource may include at most 32 CSI-RS ports; if $K_S=2$, each resource may include at most 16 CSI-RS ports; and if $2<K_S\leq8$, each resource may include at most 8 CSI-RS ports. A P-port resource may have ports (for example, CSI-RS ports) labeled from 3000 to 300(P−1). A codebook configuration (for example, PMI codebook reporting) may include a codebook type, such as a Type I single-panel codebook, a Type I multiple panel codebook, a Type II single-panel codebook, a Type II port selection codebook, a Type II enhanced port selection codebook, or any other codebook type. The codebook configuration may additionally, or alternatively, include an antenna configuration. For example, a codebook type may support a set of configurations corresponding to an antenna element configuration, $(N_1, N_2)$, a quantity of panels, $(N_g)$, and a corresponding quantity of CSI-RS antenna ports for each resource, $2N_g N_1 N_2$.

The UE 115 may receive the CSI report configuration and may perform CSI reporting using the configuration. For example, for a Type I codebook, the UE 115 may perform single-slot reporting, and the CSI report may include two parts. A first part of the CSI report may include a rank indicator (RI), a CSI-RS resource indicator (CRI), CQI for a first codeword, or some combination thereof. A second part of the CSI report may include PMI, CQI for a second codeword (for example, if RI>4), or both. Such CSI reporting may support periodic, semi-periodic, or aperiodic CSI (or any combination thereof) and may be transmitted via short or long physical uplink control channel (PUCCH) and physical uplink shared channel (PUSCH) transmissions. For a Type II codebook, the CSI report may also include two parts. A first part of the CSI report may include an RI, CQI, an indication of a quantity of non-zero wideband amplitude coefficients for each layer, or some combination thereof. The first part of the CSI report may have a fixed payload size, and each field of the first part may be encoded separately. The first part of the CSI report may indicate a quantity of information bits included in a second part of the CSI report. The second part of the CSI report may include PMI corresponding to the non-zero wideband amplitude coefficients for each layer indicated by the first part. Such CSI reporting may support semi-periodic or aperiodic CSI and may be transmitted via long PUCCH (for example, the first part) and PUSCH (for example, the first part and the second part) transmissions. The UE 115 may refrain from multiplexing CSI parameters of a CSI report across PUCCH and PUSCH transmissions. The UE 115 may determine (for example, generate, calculate) CSI reports on long PUCCH and on PUSCH independently. A UE capability may indicate whether the UE 115 supports configuration with Type II CSI reporting on both long PUCCH and PUSCH. Layer (L1) reference signal resource power (RSRP) and resource indicators for beam management may be mapped to the first part of CSI reporting if the CSI report is transmitted via long PUCCH or PUSCH.

The wireless communications system 100 may additionally or alternatively support network energy savings using dynamic antenna port configuration adaptation at a network entity 105. For example, to conserve energy, the network entity 105 may deactivate a quantity of antenna ports. Changing the quantity of active antenna ports for communication with a UE 115 may affect CSI reporting for the UE 115. For example, the UE 115 may be configured with one or more antenna port configurations for CSI reporting. In some examples, the UE 115 may be configured with multiple antenna port CQI configurations, such that the UE 115 may be configured to report CQI corresponding to 32 antenna ports (for example, CSI-RS ports) and 16 antenna ports (for example, CSI-RS ports). The UE 115 may report sub-band CQI reporting for a main antenna port configuration and wideband CQI reporting for other antenna port configurations (for example, secondary antenna port configurations), for example, to prioritize relatively more granular CQI reporting for the main antenna port configuration while informing the network about CQI for secondary antenna port configurations using relatively less granularity (for example, to save on processing and signaling overhead). If the network entity 105 updates the antenna port configuration, the UE 115 may use a mapping to update the CSI reporting granularity. The mapping may support efficient CSI reporting (CQI reporting, PMI reporting) for different antenna port configurations if the network entity 105 performs antenna port configuration adaptation.

Figure 2:
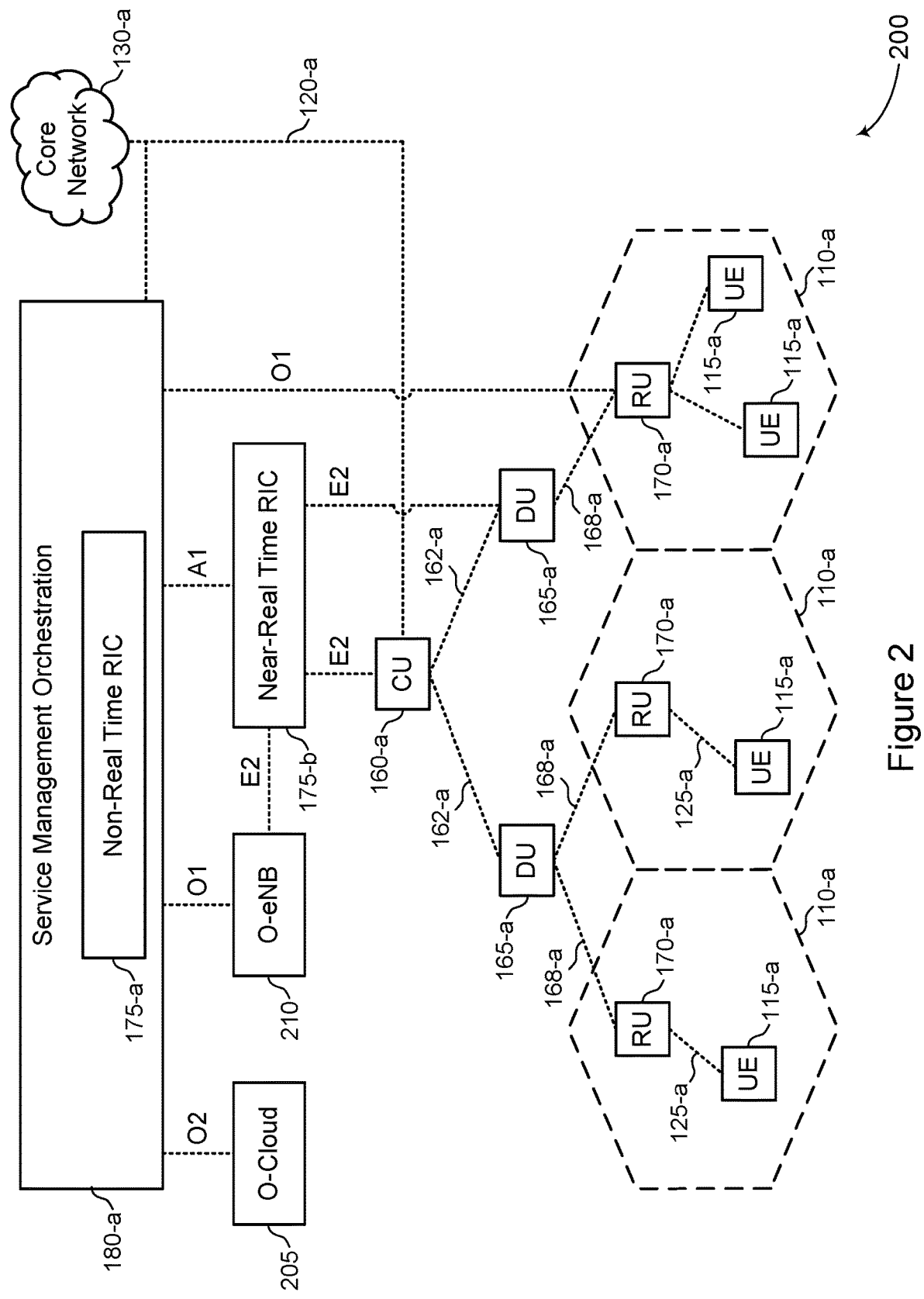
FIG. 2 illustrates an example of a network architecture that supports determining a sub-band size for CSI reporting based on an active antenna port configuration in accordance with one or more aspects of the present disclosure.

FIG. 2 illustrates an example of a network architecture 200 that supports determining a sub-band size for CSI reporting based on an active antenna port configuration in accordance with one or more aspects of the present disclosure. For example, the network architecture 200 may be a disaggregated base station architecture, a disaggregated RAN architecture, or some other architecture supporting multiple network entities 105. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (for example, a Near-RT RIC 175-b via an E2 link, or a Non-RT RIC 175-a associated with an SMO 180-a (for example, an SMO Framework), or both). A CU 160-a may communicate with one or more DUs 165-a via respective midhaul communication links 162-a (for example, an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (for example, CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (for example, data, information) via a wired or wireless transmission medium. Each network entity 105, or an associated processor (for example, controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (for example, an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or other control functions. Each control function may be implemented with an interface configured to communicate signals with other control functions hosted by the CU 160-a. A CU 160-a may be configured to manage user plane functionality (for example, CU-UP), control plane functionality (for example, CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a for network control and signaling.

A DU 165-a may correspond to a logical unit that includes one or more functions (for example, base station functions, RAN functions) to control the operation of one or more RUs 170-a. In some examples, a DU 165-a may host, at least partially, one or more of an RLC layer, a MAC layer, and one or more aspects of a PHY layer (for example, a high PHY layer, such as modules for FEC encoding and decoding, scrambling, modulation and demodulation, or other functionality) depending, at least in part, on a functional split, such as those defined by the 3rd Generation Partnership Project (3GPP). In some examples, a DU 165-a may further host one or more low PHY layers. Each layer may be implemented with an interface configured to communicate signals with other layers hosted by the DU 165-a, or with control functions hosted by a CU 160-a.

In some examples, lower-layer functionality may be implemented by one or more RUs 170-a. For example, an RU 170-a, controlled by a DU 165-a, may correspond to a logical node that hosts RF processing functions, or low-PHY layer functions (for example, performing fast Fourier transform (FFT), inverse FFT (iFFT), digital beamforming, physical random access channel (PRACH) extraction and filtering, or other functionality), or both, based at least in part on the functional split, such as a lower-layer functional split. In such an architecture, an RU 170-a may be implemented to manage over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage which may be managed via an operations and maintenance interface (for example, an O1 interface). For virtualized network entities 105, the SMO 180-a may be configured to interact with a cloud computing platform (for example, an O-Cloud 205) to perform network entity life cycle management (for example, to instantiate virtualized network entities 105) via a cloud computing platform interface (for example, an O2 interface). Such virtualized network entities 105 can include, but are not limited to, CUs 160-a, DUs 165-a, RUs 170-a, and Near-RT RICs 175-b. In some implementations, the SMO 180-a may communicate with components configured in accordance with a 4G RAN (for example, via an O1 interface). Additionally, or alternatively, in some implementations, the SMO 180-a may communicate directly with one or more RUs 170-a via an O1 interface. The SMO 180-a also may include a Non-RT RIC 175-a configured to support functionality of the SMO 180-a.

The Non-RT RIC 175-a may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-b. The Non-RT RIC 175-a may be coupled to or communicate with (for example, via an A1 interface) the Near-RT RIC 175-b. The Near-RT RIC 175-b may be configured to include a logical function that enables near-real-time control and optimization of RAN elements and resources via data collection and actions over an interface (for example, via an E2 interface) connecting one or more CUs 160-a, one or more DUs 165-a, or both, as well as an O-eNB 210, with the Near-RT RIC 175-b.

In some examples, to generate AI/ML models to be deployed in the Near-RT RIC 175-b, the Non-RT RIC 175-a may receive parameters or external enrichment information from external servers. Such information may be utilized by the Near-RT RIC 175-b and may be received at the SMO 180-a or the Non-RT RIC 175-a from non-network data sources or from network functions. In some examples, the Non-RT MC 175-a or the Near-RT RIC 175-b may be configured to tune RAN behavior or performance. For example, the Non-RT MC 175-a may monitor long-term trends and patterns for performance and employ AI or ML models to perform corrective actions through the SMO 180-a (for example, reconfiguration via 01) or via generation of RAN management policies (for example, A1 policies).

The network architecture 200 may support mapping sub-band sizes for CSI reporting to antenna port configurations. For example, a network entity 105, such as an RU 170-a, may include a set of antenna ports and may dynamically change the quantity of active antenna ports (for example, for network power savings). A UE 115-a communicating with the RU 170-a may receive an indication of the change to the active antenna port configuration and may determine a corresponding change to a sub-band size for CSI reporting based on the mapping. The network may determine the same mapping, for example, at a CU 160-a, a DU 165-a, an RU 170-a, or any combination thereof. By using the same mapping at the network-side and the UE 115-a, the network architecture 200 may support alignment between the entities for CSI-RS transmission and CSI reporting.

Figure 3:
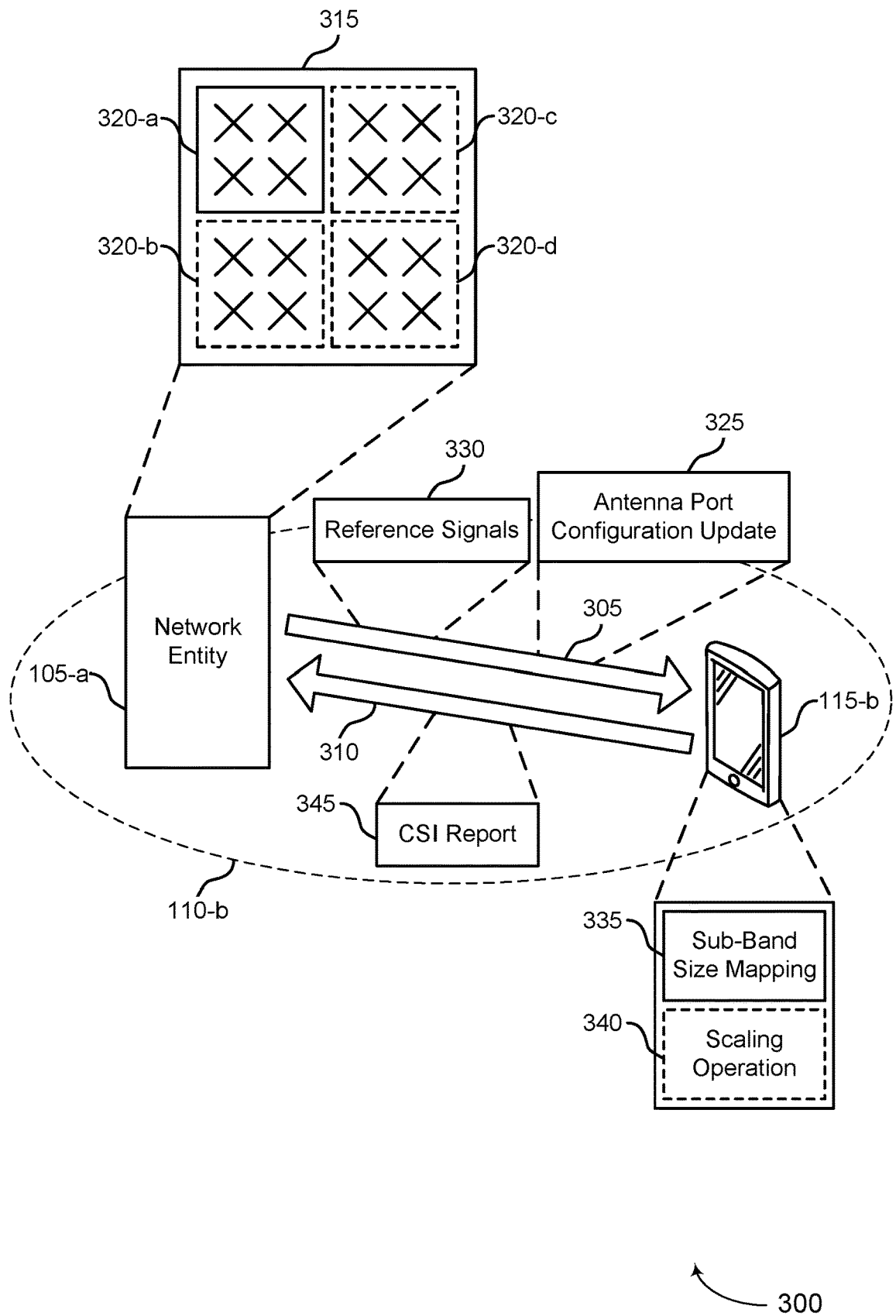
FIG. 3 illustrates an example of a wireless communications system that supports determining a sub-band size for CSI reporting based on an active antenna port configuration in accordance with one or more aspects of the present disclosure.

FIG. 3 illustrates an example of a wireless communications system 300 that supports determining a sub-band size for CSI reporting based on an active antenna port configuration in accordance with one or more aspects of the present disclosure. The wireless communications system 300 may include a network entity 105-a and a UE 115-b, which may be examples of devices described with reference to FIGS. 1 and 2. The network entity 105-a may be an example of an RU 170, a base station 140, or both including a set of antenna ports 315. The network entity 105-a may support dynamically updating an antenna port configuration of the set of antenna ports 315. To improve reporting accuracy and network flexibility, the network entity 105-a and the UE 115-b may support mappings from different antenna port configurations to different sub-band sizes for CSI reporting.

The network entity 105-a may use a set of antenna ports 315 for communicating with one or more UEs 115, other network entities 105, or both within a coverage area 110-b. To support massive-MIMO communications, the network entity 105-a may include a relatively large quantity of antenna ports for communicating with multiple different wireless devices concurrently. For example, the set of antenna ports 315 may include multiple co-located panels, each panel including multiple antenna ports. A panel (for example, an antenna panel) may be equipped with a relatively large quantity of power amplifiers and antenna subsystems to support MIMO techniques. However, the power amplifiers, antenna subsystems, or both may consume power, contributing to a relatively high power overhead for the network. To support network power savings, the network entity 105-a may dynamically deactivate one or more antenna panels, sub-panels, antenna ports, or any combination thereof to improve energy efficiency at the network. For example, the network entity 105-a may deactivate a group of antenna ports of the set of antenna ports 315 if the cell load for the network entity 105-a is relatively low (for example, the quantity of devices communicating with the network entity 105-a is below a threshold), such that the remaining active antenna ports may maintain communications with the devices within the cell coverage. As an example, the network entity 105-a may deactivate a group of antenna ports 320-b, a group of antenna ports 320-c, and a group of antenna ports 320-d, and the network entity 105-a may maintain communications using an active group of antenna ports 320-a. In some examples, the group of antenna ports 320-a may correspond to an antenna panel.

The network entity 105-a may indicate the dynamic antenna port adaptation using DCI signaling (for example, to support relatively low latency switching of antenna port configurations). For example, the network entity 105-a may transmit an antenna port configuration update 325, via a downlink channel 305, to a UE 115-b to indicate the change to the active antenna port configuration. In some examples, the antenna port configuration update 325 may indicate a quantity of currently active antenna ports following the antenna port adaptation, a quantity of deactivated antenna ports following the antenna port adaptation, an update to a main antenna port configuration for the network entity 105-a following the antenna port adaptation, or any combination thereof. The antenna port configuration update 325 may be indicated via DCI signaling (for example, using a field in a DCI message).

However, in some examples, the network entity 105-a may not support dynamically adapting CSI reporting parameters, such as a sub-band size for CSI reporting. For example, the network entity 105-a may configure CSI reporting parameters via RRC signaling, but may adapt an antenna port configuration via DCI signaling.

To support a similar dynamic update to CSI reporting based on the antenna port configuration update 325, the UE 115-b may store a mapping 335 between different antenna port configurations and different sub-band sizes for CSI reporting. A sub-band size may span a quantity of resource blocks (RBs) or other frequency resources in the frequency domain. In response to the antenna port configuration update 325, the UE 115-b may determine an updated sub-band size for CSI reporting and may use the updated sub-band size (for example, without receiving a CSI reporting reconfiguration message from the network entity 105-a). The updated sub-band size for CSI reporting may satisfy an accuracy threshold for CSI reporting based on the antenna port configuration update 325. The mapping 335 may be between different quantities of antenna ports and different sub-band sizes for CSI reporting, different types of antenna port configurations and different sub-band sizes for CSI reporting, or both. In some examples, the mapping 335 may use a scaling operation 340 to determine different mappings between antenna port configurations and sub-band sizes for CSI reporting. The network entity 105-a may store the same mapping 335 and may transmit a set of reference signals 330 to the UE 115-b for CSI measurements based on the mapping 335.

In some examples, the UE 115-b may be configured with the mapping 335 by an original equipment manufacturer (OEM) of the UE 115-b. In some other examples, the network entity 105-a may configure the UE 115-b with the mapping 335 via control signaling (for example, RRC signaling, a MAC-CE, DCI signaling). The control signaling may indicate the mapping 335 (for example, different antenna port configurations and corresponding sub-band size values) or may indicate a mapping index. If the control signaling indicates a mapping index, the UE 115-b may store a set of options for the mapping 335, and the UE 115-b may determine an option to use based on the indicated mapping index. The network entity 105-a may additionally configure the mapping options, of the mapping options may be otherwise configured at the UE 115-b. The network entity 105-a controlling the sub-band size for each antenna port configuration (for example, via RRC signaling) may provide robust flexibility for antenna port configuration and CSI reporting adaptation. In yet some other examples, the UE 115-b may determine the mapping 335 and may transmit a request to the network entity 105-a indicating the determined mapping 335. The network entity 105-a may approve or deny the use of the determined mapping 335 for the UE 115-b.

In some examples, the mapping 335 may configure, for each antenna port configuration of a set of antenna port configurations, a respective sub-band size for CSI reporting by the UE 115-b. In some examples, the mapping 335 may configure separate mappings for PMI reporting and CQI reporting. For example, the mapping 335 may map from an antenna port configuration (for example, a quantity of active antenna ports) to a first sub-band size for PMI reporting and a second sub-band size for CQI reporting. In some implementations, the first sub-band size and the second sub-band size may be the same or different. Table 1 provides an example mapping 335 from different quantities of active antenna ports (for example, different antenna port codebooks, different antenna port configurations) to different sub-band sizes for PMI reporting, CQI reporting, or both.

TABLE 1

Example Mapping

| Antenna Port Configuration | PMI Sub-Band Size | CQI Sub-Band Size |
|---|---|---|
| 32 Ports | 4 RBs | 8 RBs |
| 16 Ports | 8 RBs | 8 RBs |
| 8 Ports | 12 RBs | 16 RBs |
| 4 Ports | 16 RBs | 16 RBs |

In some examples, the network entity 105-a may configure the UE 115-b to report sub-band-based CSI reporting for a main port configuration and report wideband-based CSI reporting for other port configurations (for example, secondary port configurations). If the UE 115-b stores a mapping 335 between quantities of active antenna ports and sub-band sizes for CSI reporting, the UE 115-b may apply the mapping 335 for the main port configuration and may apply a different mapping or may use a default band size (for example, a wideband value) for the secondary port configurations.

In some examples, the mapping 335 may configure, for different types of antenna port configurations (for example, a main antenna port configuration versus a secondary antenna port configuration), a respective sub-band size for CSI reporting by the UE 115-b. The main antenna port configuration may correspond to sub-band CSI reporting (for example, spanning a first quantity of frequency resources) and the secondary antenna port configuration may correspond to wideband CSI reporting (for example, spanning a second quantity of frequency resources greater than the first quantity). Such a mapping 335 may provide a relatively greater granularity and—correspondingly—accuracy for the main antenna port configuration as compared to secondary antenna port configurations. Table 2 provides an example mapping 335 from different antenna port configuration types to different sub-band sizes for CSI reporting (for example, PMI reporting, CQI reporting, or both).

TABLE 2

Example Mapping

| Antenna Port Configuration Type | CSI Sub-Band Size |
|---|---|
| Main | 4 RBs |
| Secondary | 12 RBs |

In some examples, the mapping 335 may configure separate mappings for PMI reporting and CQI reporting. For example, the mapping 335 may map from a main antenna port configuration configured for the UE 115-b to a first sub-band size for PMI reporting and a second sub-band size for CQI reporting. Additionally, or alternatively, the mapping 335 may map from a secondary antenna port configuration configured for the UE 115-*b* to a third sub-band size for PMI reporting and a fourth sub-band size for CQI reporting, and the UE 115-*b* may report CSI for one or more secondary port configurations. The first, second, third, and fourth sub-band sizes may all be different or may include one or more same values based on the mapping 335. Table 3 provides an example mapping 335 from different antenna port configuration types to different sub-band sizes for PMI reporting and CQI reporting.

TABLE 3

Example Mapping

| Antenna Port Configuration Type | PMI Sub-Band Size | CQI Sub-Band Size |
|---|---|---|
| Main | 4 RBs | 8 RBs |
| Secondary | 16 RBs | 16 RBs |

The main antenna port configuration may correspond to a main CSI reporting codebook, and the secondary antenna port configuration may correspond to a secondary CSI reporting codebook. The UE 115-*b* may report CSI measurements for one main antenna port configuration and may report CSI measurements for any quantity of secondary antenna port configurations, for example, based on a configuration of the UE 115-*b*.

In some examples, the network entity 105-*a* may configure the UE 115-*b* with a sub-band size for a first quantity of antenna ports, and the UE 115-*b* may apply a scaling operation 340 to determine additional sub-band sizes corresponding to other quantities of antenna ports. For example, the network entity 105-*a* may configure the UE 115-*b* with a first sub-band size of 16 RBs for CSI reporting for 32 active antenna ports. Based on a scaling operation 340 (for example, to maintain a same ratio of RBs to active antenna ports) and the first sub-band size configured for a first quantity of active antenna ports (for example, 32), the UE 115-*b* may determine to use a sub-band size of 8 RBs for CSI reporting for 16 active antenna ports. The UE 115-*b* may determine one or more additional mappings from quantities of active antenna ports to sub-band sizes based on the scaling operation 340.

The scaling operation 340 may be an example of a fixed scaling operation configured at the UE 115-*b* or the network entity 105-*a* may configure (for example, via RRC signaling) the scaling operation 340 for the UE 115-*b*. In some examples, the scaling operation 340 may include linear scaling, for example, based on a scaling parameter, a. In some such examples, the network entity 105-*a* may configure the scaling parameter via control signaling, and the UE 115-*b* may determine the mapping 335 based on the scaling parameter according to Equation 1.

$$\text{Sub-Band Size} = \alpha \times \text{Quantity of Ports} \quad (1)$$

In some other examples, the scaling operation 340 may include non-linear or some other generic scaling, for example, based on an RRC configured relation. In some examples, the scaling operation 340 may be the same or different for PMI reporting and CQI reporting.

The UE 115-*b* may receive the antenna port configuration update 325 from the network entity 105-*a* (for example, via DCI signaling, MAC-CE signaling) and may determine an update to the active antenna port configuration at the network entity 105-*a*. For example, the antenna port configuration update 325 may indicate an updated active quantity of antenna ports at the network entity 105-*a*. Additionally, or alternatively, the antenna port configuration update 325 may indicate an updated main antenna port configuration for the network entity 105-*a* (for example, indicating a switch to using a different antenna port configuration as the "main" antenna port configuration for communications). Based on the antenna port configuration update 325 and the mapping 335 (for example, the mapping 335 previously configured at the UE 115-*b*), the UE 115-*b* may determine a corresponding update to one or more sub-band sizes for CSI reporting (for example, PMI reporting, CQI reporting, or both).

The network entity 105-*a* may transmit a set of reference signals 330 supporting CSI measurements, such as CSI-RSs, synchronization signal blocks (SSBs), or other reference signals. The network entity 105-*a* may transmit the reference signals 330 at a granularity based on the updated sub-band sizes for CSI reporting. For example, if the updated sub-band size for CSI reporting is 4 RBs, the network entity 105-*a* may transmit a CSI-RS at least every 4 RBs within a frequency range for CSI reporting. The UE 115-*b* may monitor for and detect one or more reference signals 330 of the set of reference signals 330. The UE 115-*b* may perform CSI measurements using the detected reference signals 330 to determine CSI for a channel between the UE 115-*b* and the network entity 105-*a*. Additionally, or alternatively, the UE 115-*b* may perform CSI measurements for one or more other network entities 105 using reference signals 330 received from the other network entities 105 and using the determined sub-band sizes for CSI reporting.

The UE 115-*b* may transmit, to the network entity 105-*a* and via an uplink channel 310, a CSI report 345 based on the CSI measurements. For example, the granularity of CSI measurements in the CSI report 345 may be based on the determined sub-band sizes for CSI reporting in accordance with the antenna port configuration update 325. For example, if the UE 115-*b* determines a sub-band size for CSI reporting of 4 RBs, the UE 115-*b* may include CSI measurements corresponding to respective 4 RB sub-bands in the CSI report 345. In some examples, the UE 115-*b* may use different reporting granularities for a main antenna port configuration versus secondary antenna port configurations, PMI reporting versus CQI reporting, or both in the CSI report 345. The network entity 105-*a* may receive the CSI report 345 and may determine CSI measurements for the UE 115-*b* based on the information in the CSI report 345.

By using the mapping 335, the UE 115-*b* may dynamically update a sub-band size for CSI reporting (for example, PMI reporting, CQI reporting, or both) for different antenna port configurations, for example, in response to an antenna port configuration update 325 triggered by the network entity 105-*a*. Such dynamic updates may support improved CSI reporting if the network entity 105-*a* dynamically adapts an active antenna port configuration (for example, which antenna ports of the set of antenna ports 315 are currently active). For example, if the network entity 105-*a* decreases the quantity of active antenna ports, the mapping 335 may allow the UE 115-*b* to correspondingly increase a sub-band size for CSI reporting, reducing the processing overhead and signaling overhead associated with CSI reporting. Additionally, or alternatively, if the network entity 105-*a* increases the quantity of active antenna ports, the mapping 335 may allow the UE 115-*b* to correspondingly decrease a sub-band size for CSI reporting, supporting relatively more granular CSI feedback and—correspondingly—relatively more accurate precoding for communications between the UE 115-b and the network entity 105-a.

Figure 4:
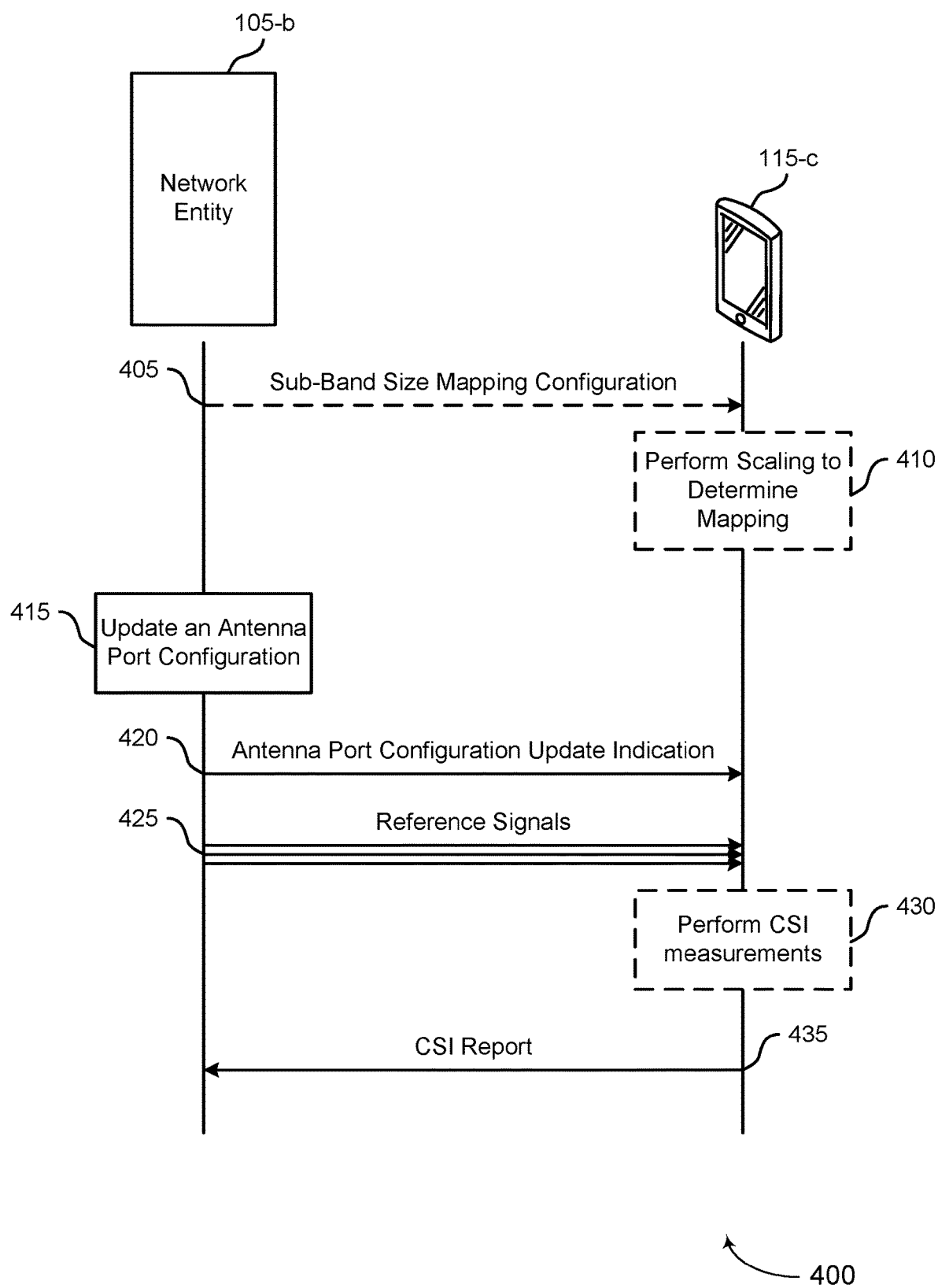
FIG. 4 illustrates an example of a process flow that supports determining a sub-band size for CSI reporting based on an active antenna port configuration in accordance with one or more aspects of the present disclosure.

FIG. 4 illustrates an example of a process flow 400 that supports determining a sub-band size for CSI reporting based on an active antenna port configuration in accordance with one or more aspects of the present disclosure. The process flow 400 may be implemented in a wireless communications system 100, a network architecture 200, or a wireless communications system 300 as described with reference to FIGS. 1-3. The process flow 400 may include a UE 115-c, which may be an example of a UE 115 as described with reference to FIGS. 1-3, and a network entity 105-b, which may be an example of a network entity 105 as described with reference to FIGS. 1-3. The process flow 400 may support a mapping between different antenna port configurations and respective sub-band sizes for CSI reporting, allowing the UE 115-c to update CSI reporting granularity in response to a dynamic antenna port configuration adaptation at the network entity 105-b. In the following description of the process flow 400, the operations performed by the devices may be performed in different orders or at different times. Additionally, or alternatively, some operations may be omitted from the process flow 400, and other operations may be added to the process flow 400.

In some examples, at 405, the network entity 105-b may transmit a control signal configuring a sub-band size mapping for the UE 115-c. The control signal may be an example of an RRC signal. In some other examples, the UE 115-c may be pre-configured with the mapping (for example, by an OEM or otherwise). The mapping may map between different antenna port configurations and respective sub-band sizes for CSI reporting. The mapping may provide an association between an updated antenna port configuration and a sub-band size for reporting CSI.

In some examples, the control signal may configure a mapping from antenna port quantities to respective sub-band sizes. The control signal may configure a first mapping from the antenna port quantities to first respective sub-band sizes for PMI reporting, a second mapping from the antenna port quantities to second respective sub-bands sizes for CQI reporting, or both. In some other examples, the control signal may configure a mapping from antenna port configuration types to respective sub-band sizes. For example, the UE 115-c may be configured with multiple antenna port configurations for the network entity 105-b including a main antenna port configuration and one or more secondary antenna port configurations. The control signal may configure a mapping from the main antenna port configuration to a main sub-band size for CSI reporting and from the one or more secondary antenna port configurations to a secondary sub-band size for CSI reporting. For example, the control signal may configure a first mapping from the main antenna port configuration to a first main sub-band size for PMI reporting and from the one or more secondary antenna port configurations to a first secondary sub-band size for PMI reporting. Additionally, or alternatively, the control signal may configure a second mapping from the main antenna port configuration to a second main sub-band size for CQI reporting and from the one or more secondary antenna port configurations to a second secondary sub-band size for CQI reporting.

In yet some other examples, the control signal may configure a first mapping from a first antenna port quantity to a respective sub-band size for CSI reporting. In some such examples, at 410, the UE 115-c may perform a scaling operation to determine other mappings. For example, the UE 115-c may determine an additional mapping from one or more additional antenna port quantities to one or more additional respective sub-band sizes for CSI reporting based on the first mapping and the scaling operation. In some examples, the scaling operation may be pre-configured at the UE 115-c. In some other examples, the scaling operation may be configured by the network entity 105-b (for example, via RRC signaling). The scaling operation may be a linear scaling operation or a non-linear scaling operation. In some examples, the UE 115-c may use different scaling operations for PMI mapping and CQI mapping, may use different first mappings configured by the network for PMI mapping and CQI mapping, or both.

At 415, the network entity 105-b may update an antenna port configuration. For example, the network entity 105-b may perform dynamic antenna port configuration adaptation to adjust network power savings associated with antenna port usage (for example, based on active power amplifiers, antenna subsystems, or both). The network entity 105-b may update a quantity of active antenna ports for the network entity 105-b from a first quantity of antenna ports to a second quantity of antenna ports. Additionally, or alternatively, the network entity 105-b may update a main antenna port configuration for the network entity 105-b from a first antenna port configuration to a second antenna port configuration.

At 420, the network entity 105-b may transmit a control signal indicating the updated antenna port configuration for the network entity 105-b. The UE 115-c may receive the control signal and determine the updated antenna port configuration based on the control signal. The control signal may be an example of a DCI signal, a MAC-CE, or both. In some examples, the control signal may indicate an updated quantity of active antenna ports, an antenna port configuration set as an updated main antenna port configuration, or both for the network entity 105-b. The UE 115-c may use the updated antenna port configuration and the mapping (for example, the association between the updated antenna port configuration and a sub-band size) to determine an updated sub-band size for CSI reporting. In some examples, the UE 115-c may determine multiple sub-band sizes for CSI reporting, such as different sub-band sizes for PMI and CQI reporting, different sub-band sizes for main and secondary antenna port configuration reporting, or some combination thereof.

At 425, the network entity 105-b may transmit a set of reference signals (for example, CSI-RSs, SSBs) based on the updated antenna port configuration. The set of reference signals may support CSI reporting according to the association between the updated antenna port configuration and the one or more sub-band sizes for CSI reporting. For example, the network entity 105-b may additionally store the mapping and determine an updated sub-band size for CSI reporting based on the updated antenna port configuration. The reference signals may support the updated sub-band size for CSI reporting at the UE 115-c. The UE 115-c may receive the set of reference signals—or at least a portion of the reference signals—and, at 430, may perform CSI measurements using the reference signals. The UE 115-c may perform the CSI measurements according to the CSI reporting granularity determined using the mapping. For example, the UE 115-c may determine CSI measurements (for example, CQI values, PMI values) for multiple sub-bands according to the determined sub-band sizes.

At 435, the UE 115-c may transmit, to the network entity 105-b, a CSI report including CSI measurements according to the determined sub-band sizes and based on the reference signals. For example, the CSI report may include a respective CQI value for multiple sub-bands of the CQI sub-band size for CSI reporting based on the updated antenna port configuration. Additionally, or alternatively, the CSI report may include a respective PMI value for multiple sub-bands of the PMI sub-band size for CSI reporting based on the updated antenna port configuration. In some examples, the CSI report may include CSI measurements for a main antenna port configuration and one or more secondary antenna port configurations according to different sub-band granularities for CSI reporting. The UE 115-c and the network entity 105-b may communicate based on CSI measurements included in the CSI report.

Figure 5:
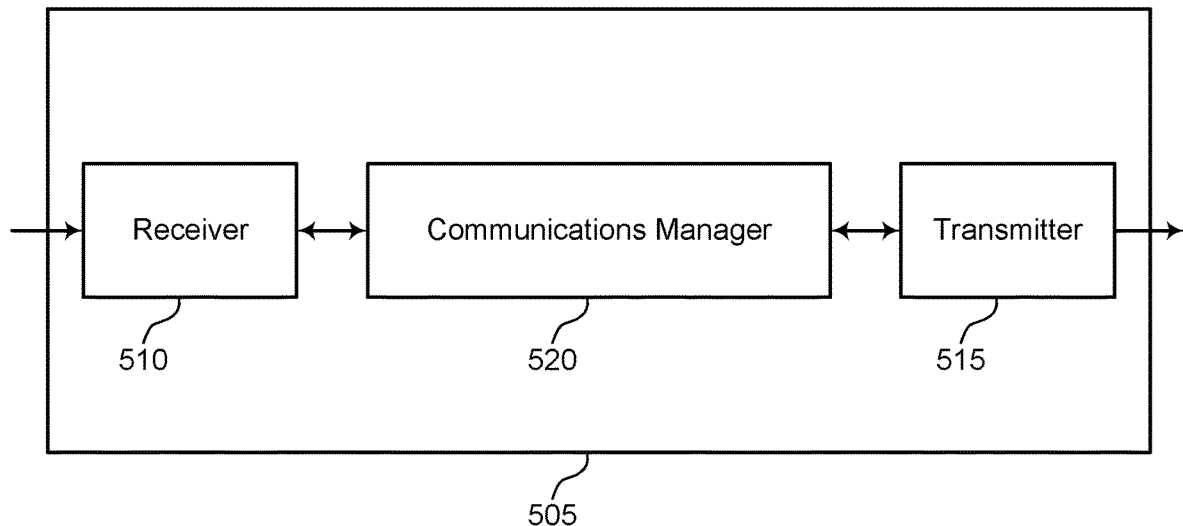
FIGS. 5 and 6 show block diagrams of devices that support determining a sub-band size for CSI reporting based on an active antenna port configuration in accordance with one or more aspects of the present disclosure.

FIG. 5 shows a block diagram of a device 505 that supports determining a sub-band size for CSI reporting based on an active antenna port configuration in accordance with one or more aspects of the present disclosure. The device 505 may be an example of aspects of a UE 115. The device 505 may include a receiver 510, a transmitter 515, and a communications manager 520. The communications manager 520 can be implemented, at least in part, by one or both of a modem and a processor. Each of these components may be in communication with one another (for example, via one or more buses).

The receiver 510 may provide a means for receiving information such as packets, user data, control information, or any combination thereof associated with various information channels (for example, control channels, data channels, information channels related to determining sub-band sizes for CSI reporting based on antenna port configuration adaptation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (for example, control channels, data channels, information channels related to determining sub-band sizes for CSI reporting based on antenna port configuration adaptation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of determining sub-band sizes for CSI reporting based on antenna port configuration adaptation. For example, the communications manager 520, the receiver 510, the transmitter 515, or various combinations or components thereof may support a method for performing one or more of the functions associated with sub-band size determination for CSI reporting.

In some examples, the communications manager 520 may be configured to perform various operations (for example, receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations associated with sub-band size determination for CSI reporting.

The communications manager 520 may support wireless communications at a UE in accordance with examples as disclosed herein. For example, the communications manager 520 may be configured as or otherwise support a means for receiving, from a network entity, a control signal indicating an updated antenna port configuration for the network entity. The communications manager 520 may be configured as or otherwise support a means for receiving, from the network entity, a set of multiple reference signals based on the updated antenna port configuration and on an association between the updated antenna port configuration and a sub-band size for reporting CSI. The communications manager 520 may be configured as or otherwise support a means for transmitting, to the network entity, a CSI report including CSI measurements, the CSI measurements based on the sub-band size and the set of multiple reference signals.

By including or configuring the communications manager 520, the device 505 (for example, a processor controlling or otherwise coupled with the receiver 510, the transmitter 515, the communications manager 520, or a combination thereof) may support techniques for reducing latency and processing overhead associated with reconfiguring CSI reporting granularity. For example, rather than using RRC signaling to reconfigure sub-band sizes for CSI reporting, the device 505 may use the association between the updated antenna port configuration and a sub-band size for reporting CSI to update a CSI reporting granularity in response to an updated antenna port configuration. Additionally, or alternatively, the device 505 may improve CSI measurement accuracy using techniques associated with sub-band size determination for CSI reporting, improving communication reliability and correspondingly reducing processing resources involved in retransmissions. The device 505 may reduce a quantity of processing units spun up to manage CSI reporting reconfiguration signaling, retransmission signaling, or both based on using a mapping to determine CSI reporting granularity.

Figure 6:
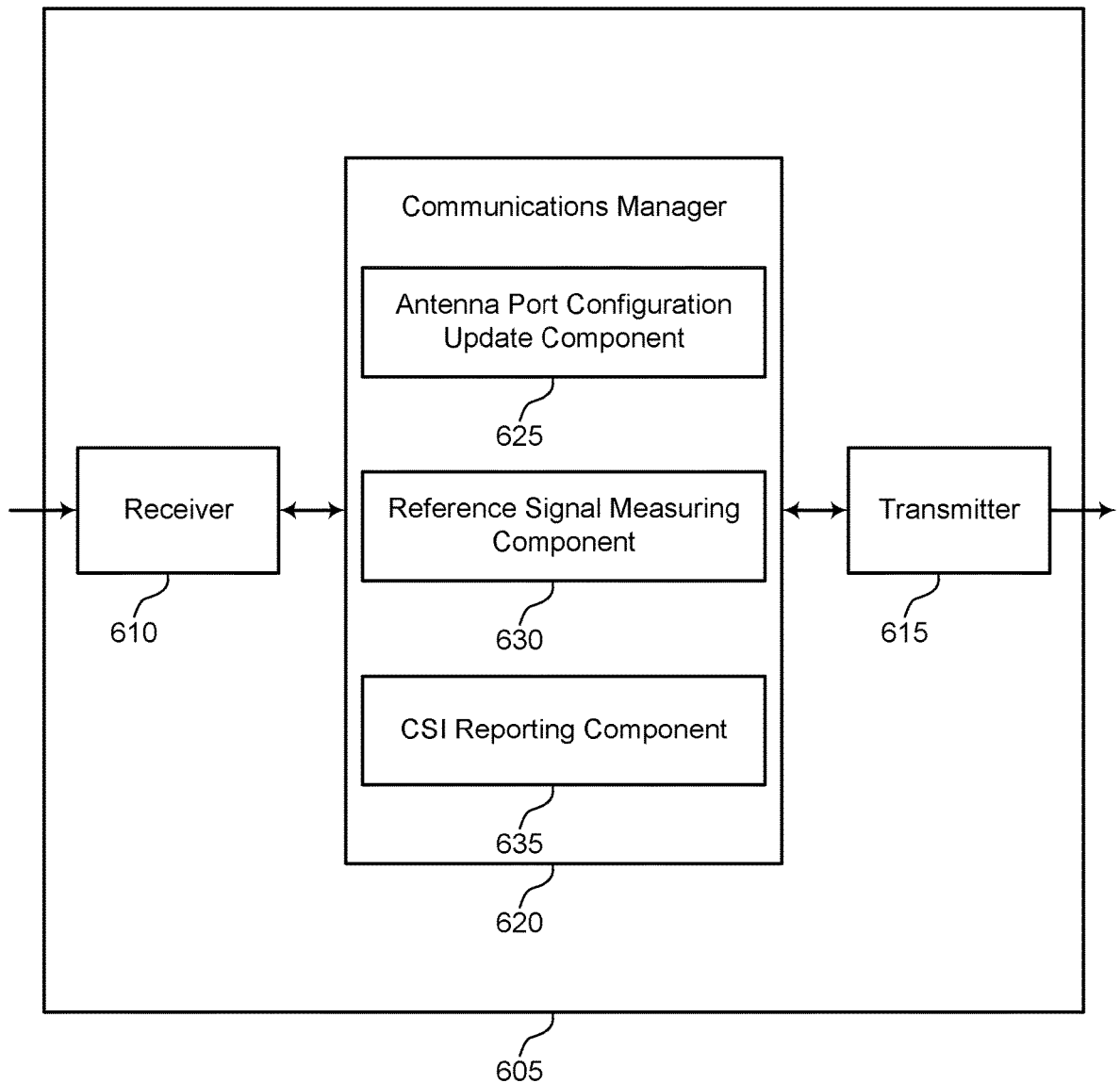

FIG. 6 shows a block diagram of a device 605 that supports determining a sub-band size for CSI reporting based on an active antenna port configuration in accordance with one or more aspects of the present disclosure. The device 605 may be an example of aspects of a device 505 or a UE 115. The device 605 may include a receiver 610, a transmitter 615, and a communications manager 620. The communications manager 620 can be implemented, at least in part, by one or both of a modem and a processor. Each of these components may be in communication with one another (for example, via one or more buses).

The receiver 610 may provide a means for receiving information such as packets, user data, control information, or any combination thereof associated with various information channels (for example, control channels, data channels, information channels related to determining sub-band sizes for CSI reporting based on antenna port configuration adaptation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (for example, control channels, data channels, information channels related to determining sub-band sizes for CSI reporting based on antenna port configuration adaptation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of determining sub-band sizes for CSI reporting based on antenna port configuration adaptation. For example, the communications manager 620 may include an antenna port configuration update component 625, a reference signal measuring component 630, a CSI reporting component 635, or any combination thereof. In some examples, the communications manager 620, or various components thereof, may be configured to perform various operations (for example, receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations associated with sub-band size determination for CSI reporting.

The communications manager 620 may support wireless communications at a UE in accordance with examples as disclosed herein. The antenna port configuration update component 625 may be configured as or otherwise support a means for receiving, from a network entity, a control signal indicating an updated antenna port configuration for the network entity. The reference signal measuring component 630 may be configured as or otherwise support a means for receiving, from the network entity, a set of multiple reference signals based on the updated antenna port configuration and on an association between the updated antenna port configuration and a sub-band size for reporting CSI. The CSI reporting component 635 may be configured as or otherwise support a means for transmitting, to the network entity, a CSI report including CSI measurements, the CSI measurements based on the sub-band size and the set of multiple reference signals.

Figure 7:
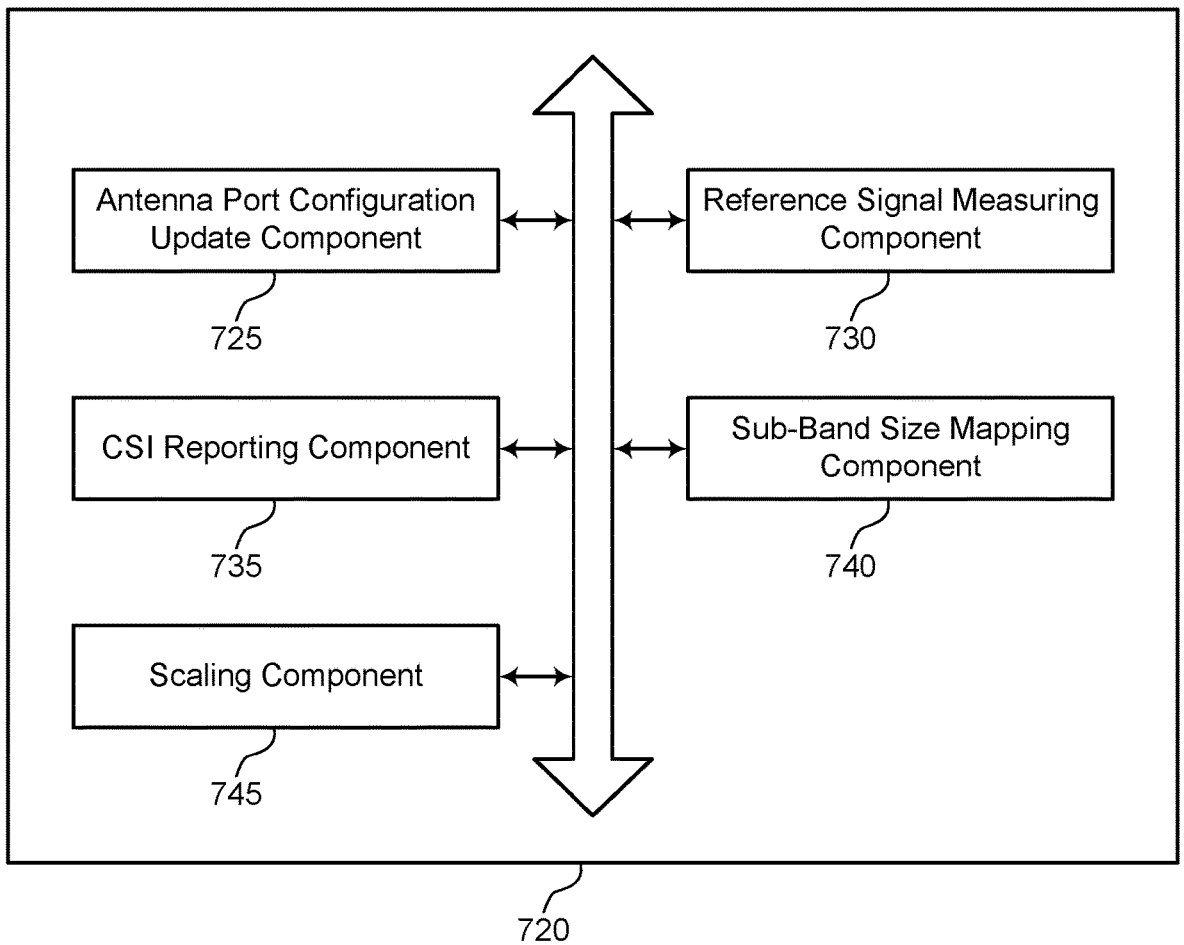
FIG. 7 shows a block diagram of a communications manager that supports determining a sub-band size for CSI reporting based on an active antenna port configuration in accordance with one or more aspects of the present disclosure.

FIG. 7 shows a block diagram of a communications manager 720 that supports determining a sub-band size for CSI reporting based on an active antenna port configuration in accordance with one or more aspects of the present disclosure. The communications manager 720, or various components thereof, may be an example of means for performing various aspects of determining sub-band sizes for CSI reporting based on antenna port configuration adaptation. For example, the communications manager 720 may include an antenna port configuration update component 725, a reference signal measuring component 730, a CSI reporting component 735, a sub-band size mapping component 740, a scaling component 745, or any combination thereof. Each of these components may communicate, directly or indirectly, with one another (for example, via one or more buses).

The communications manager 720 may support wireless communications at a UE in accordance with examples as disclosed herein. The antenna port configuration update component 725 may be configured as or otherwise support a means for receiving, from a network entity, a control signal indicating an updated antenna port configuration for the network entity. The reference signal measuring component 730 may be configured as or otherwise support a means for receiving, from the network entity, a set of multiple reference signals based on the updated antenna port configuration and on an association between the updated antenna port configuration and a sub-band size for reporting CSI. The CSI reporting component 735 may be configured as or otherwise support a means for transmitting, to the network entity, a CSI report including CSI measurements, the CSI measurements based on the sub-band size and the set of multiple reference signals.

In some examples, the sub-band size mapping component 740 may be configured as or otherwise support a means for receiving, from the network entity, a second control signal configuring a mapping from a set of multiple antenna port quantities to a set of multiple respective sub-band sizes. The association between the updated antenna port configuration and the sub-band size may be based on the mapping.

In some examples, the second control signal configures a first mapping from the set of multiple antenna port quantities to a first set of multiple respective sub-band sizes for PMI reporting, a second mapping from the set of multiple antenna port quantities to a second set of multiple respective sub-band sizes for CQI reporting, or both. In some examples, the CSI report includes PMI information according to the first set of multiple respective sub-band sizes, CQI information according to the second set of multiple respective sub-band sizes, or both. In some examples, the second control signal includes an RRC signal.

In some examples, the UE is configured with a set of multiple antenna port configurations for the network entity including a main antenna port configuration and one or more secondary antenna port configurations, and the sub-band size mapping component 740 may be configured as or otherwise support a means for receiving, from the network entity, a second control signal configuring a mapping from the main antenna port configuration to a main sub-band size and from the one or more secondary antenna port configurations to a secondary sub-band size. The association between the updated antenna port configuration and the sub-band size may be based on the mapping.

In some examples, the second control signal configures a first mapping from the main antenna port configuration to a first main sub-band size for PMI reporting and from the one or more secondary antenna port configurations to a first secondary sub-band size for the PMI reporting, a second mapping from the main antenna port configuration to a second main sub-band size for CQI reporting and from the one or more secondary antenna port configurations to a second secondary sub-band size for the CQI reporting, or both. In some examples, the CSI report includes PMI information according to the first main sub-band size and the first secondary sub-band size, CQI information according to the second main sub-band size and the second secondary sub-band size, or both. In some examples, the second control signal includes an RRC signal.

In some examples, the updated antenna port configuration indicates an updated quantity of active antenna ports for the network entity, an updated main antenna port configuration for the network entity, or both.

In some examples, the sub-band size mapping component 740 may be configured as or otherwise support a means for receiving, from the network entity, a second control signal configuring a first mapping from an antenna port quantity to a respective sub-band size. In some examples, the scaling component 745 may be configured as or otherwise support a means for determining an additional mapping from one or more additional antenna port quantities to one or more additional respective sub-band sizes based on the first mapping and a scaling operation. The association between the updated antenna port configuration and the sub-band size may be based on the first mapping, the additional mapping, or both. In some examples, the second control signal further configures the scaling operation.

In some examples, the control signal includes a DCI signal, a MAC-CE, or both.

Figure 8:
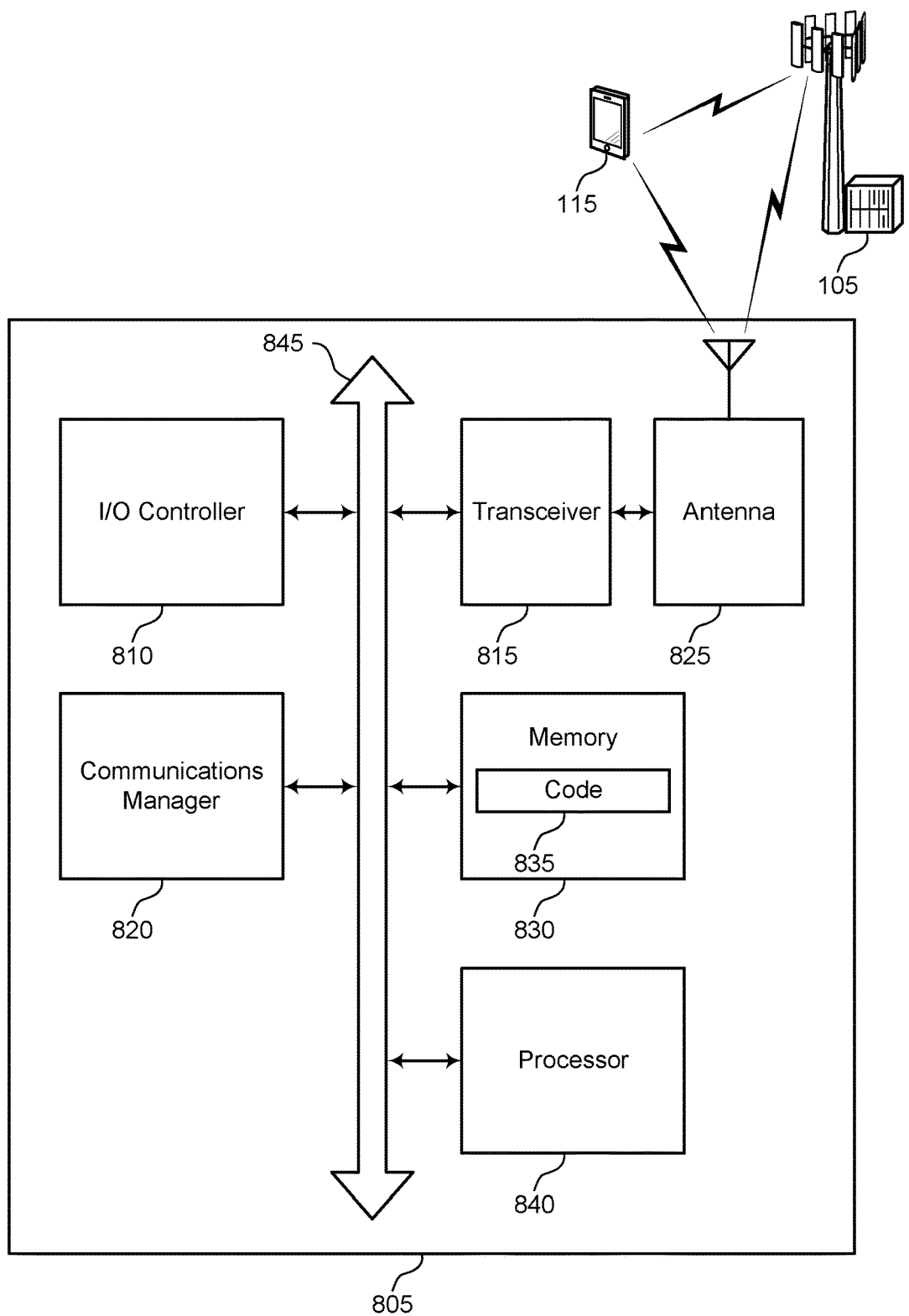
FIG. 8 shows a diagram of a system including a device that supports determining a sub-band size for CSI reporting based on an active antenna port configuration in accordance with one or more aspects of the present disclosure.

FIG. 8 shows a diagram of a system including a device 805 that supports determining a sub-band size for CSI reporting based on an active antenna port configuration in accordance with one or more aspects of the present disclosure. The device 805 may be an example of or include the components of a device 505, a device 605, or a UE 115. The device 805 may communicate (for example, wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (for example, operatively, communicatively, functionally, electronically, electrically) via one or more buses (for example, a bus 845).

The I/O controller 810 may manage input and output signals for the device 805. The I/O controller 810 may also manage peripherals not integrated into the device 805. In some implementations, the I/O controller 810 may represent a physical connection or port to an external peripheral. In some implementations, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some implementations, the I/O controller 810 may be implemented as part of a processor, such as the processor 840. In some implementations, a user may interact with the device 805 via the I/O controller 810 or via hardware components controlled by the I/O controller 810.

In some implementations, the device 805 may include a single antenna 825. However, in some other implementations, the device 805 may have more than one antenna 825, which may be capable of concurrently transmitting or receiving multiple wireless transmissions. The transceiver 815 may communicate bi-directionally, via the one or more antennas 825, wired, or wireless links. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof.

The memory 830 may include random access memory (RAM) and read-only memory (ROM). The memory 830 may store computer-readable, computer-executable code 835 including instructions that, when executed by the processor 840, cause the device 805 to perform various functions associated with sub-band size determination for CSI reporting. The code 835 may be stored in a non-transitory computer-readable medium such as system memory or another type of memory. In some implementations, the code 835 may not be directly executable by the processor 840 but may cause a computer (for example, when compiled and executed) to perform functions associated with sub-band size determination for CSI reporting. In some implementations, the memory 830 may contain, among other things, a basic I/O system (BIOS) which may control basic hardware or software operation such as the interaction with peripheral components or devices.

The processor 840 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some implementations, the processor 840 may be configured to operate a memory array using a memory controller. In some other implementations, a memory controller may be integrated into the processor 840. The processor 840 may be configured to execute computer-readable instructions stored in a memory (for example, the memory 830) to cause the device 805 to perform various functions (for example, functions or tasks supporting determining sub-band sizes for CSI reporting based on antenna port configuration adaptation). For example, the device 805 or a component of the device 805 may include a processor 840 and memory 830 coupled with or to the processor 840, the processor 840 and memory 830 configured to perform various functions associated with sub-band size determination for CSI reporting.

The communications manager 820 may support wireless communications at a UE in accordance with examples as disclosed herein. For example, the communications manager 820 may be configured as or otherwise support a means for receiving, from a network entity, a control signal indicating an updated antenna port configuration for the network entity. The communications manager 820 may be configured as or otherwise support a means for receiving, from the network entity, a set of multiple reference signals based on the updated antenna port configuration and on an association between the updated antenna port configuration and a sub-band size for reporting CSI. The communications manager 820 may be configured as or otherwise support a means for transmitting, to the network entity, a CSI report including CSI measurements, the CSI measurements based on the sub-band size and the set of multiple reference signals.

By including or configuring the communications manager 820, the device 805 may support techniques for improved communication reliability, reduced latency associated with updating CSI reporting granularity, reduced power consumption, or any combination thereof.

In some examples, the communications manager 820 may be configured to perform various operations (for example, receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of determining sub-band sizes for CSI reporting based on antenna port configuration adaptation, or the processor 840 and the memory 830 may be otherwise configured to perform or support such operations.

Figure 9:
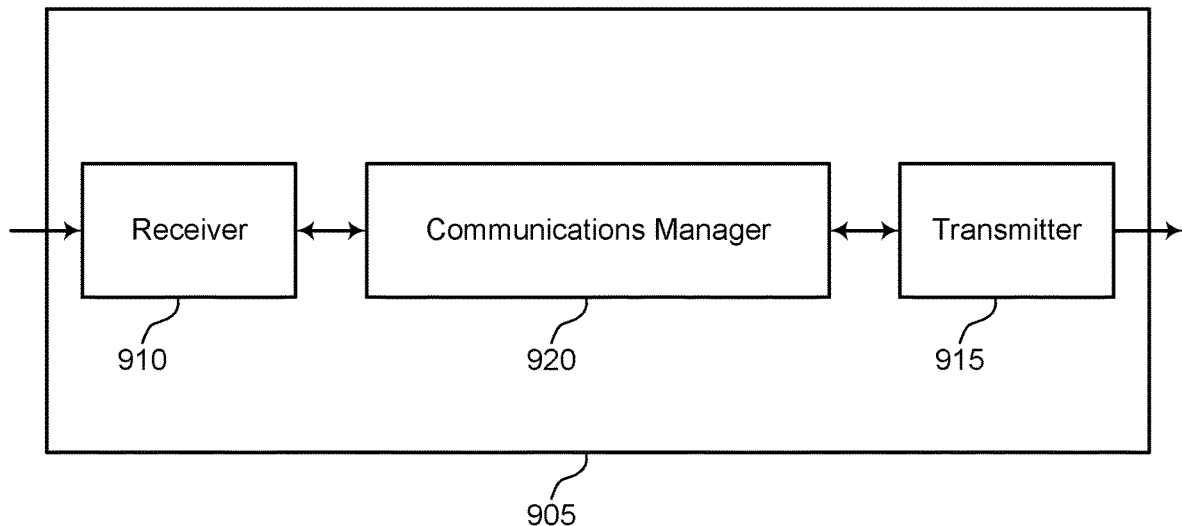
FIGS. 9 and 10 show block diagrams of devices that support determining a sub-band size for CSI reporting based on an active antenna port configuration in accordance with one or more aspects of the present disclosure.

FIG. 9 shows a block diagram of a device 905 that supports determining a sub-band size for CSI reporting based on an active antenna port configuration in accordance with one or more aspects of the present disclosure. The device 905 may be an example of aspects of a network entity 105, such as a base station, an RU, or some other network entity. The device 905 may include a receiver 910, a transmitter 915, and a communications manager 920. The communications manager 920 can be implemented, at least in part, by one or both of a modem and a processor. Each of these components may be in communication with one another (for example, via one or more buses).

The receiver 910 may provide a means for obtaining (for example, receiving, determining, identifying) information such as user data, control information, or any combination thereof (for example, I/Q samples, symbols, packets, protocol data units, service data units) associated with various channels (for example, control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (for example, electrical, fiber optic) interfaces, wireless interfaces, or any combination thereof.

The transmitter 915 may provide a means for outputting (for example, transmitting, providing, conveying, sending) information generated by other components of the device 905. For example, the transmitter 915 may output information such as user data, control information, or any combination thereof (for example, I/Q samples, symbols, packets, protocol data units, service data units) associated with various channels (for example, control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (for example, electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of determining sub-band sizes for CSI reporting based on antenna port configuration adaptation. For example, the communications manager 920, the receiver 910, the transmitter 915, or various combinations or components thereof may support a method for performing one or more of the functions associated with sub-band size determination for CSI reporting.

In some examples, the communications manager 920 may be configured to perform various operations (for example, receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations associated with sub-band size determination for CSI reporting.

The communications manager 920 may support wireless communications at a network entity in accordance with examples as disclosed herein. For example, the communications manager 920 may be configured as or otherwise support a means for transmitting a control signal indicating an updated antenna port configuration for the network entity. The communications manager 920 may be configured as or otherwise support a means for transmitting a set of multiple reference signals based on the updated antenna port configuration and on an association between the updated antenna port configuration and a sub-band size for a CSI report. The communications manager 920 may be configured as or otherwise support a means for receiving the CSI report including CSI measurements, the CSI measurements based on the sub-band size and the set of multiple reference signals.

By including or configuring the communications manager 920, the device 905 (for example, a processor controlling or otherwise coupled with the receiver 910, the transmitter 915, the communications manager 920, or a combination thereof) may support techniques for reduced power consumption while maintaining CSI reporting reliability. For example, the device 905 may dynamically update an antenna port configuration to reduce a network power overhead. Additionally, the device 905 may reduce a signaling overhead associated with adjusting the CSI reporting granularity using a mapping.

Figure 10:
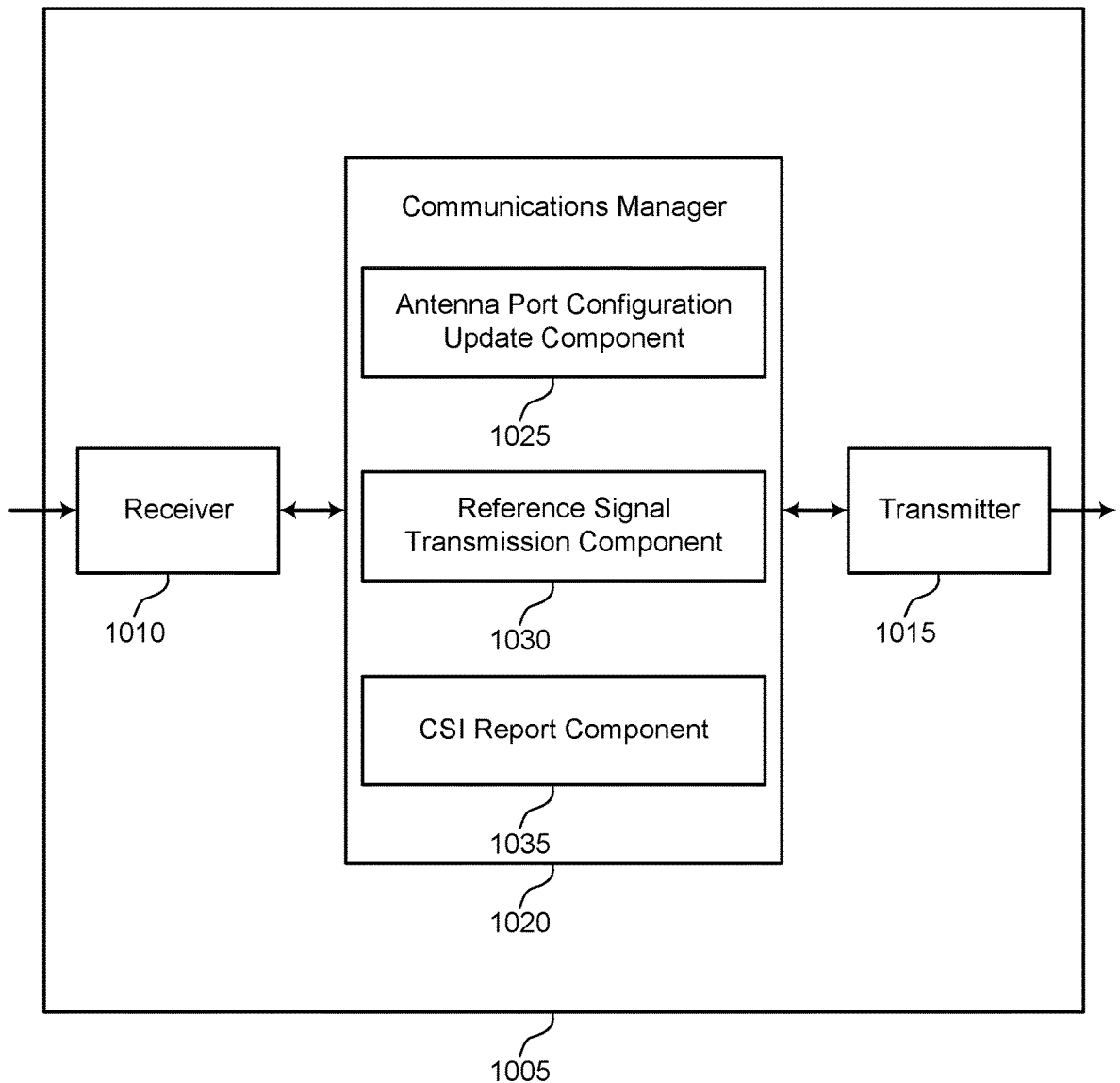

FIG. 10 shows a block diagram of a device 1005 that supports determining a sub-band size for CSI reporting based on an active antenna port configuration in accordance with one or more aspects of the present disclosure. The device 1005 may be an example of aspects of a device 905 or a network entity 105. The device 1005 may include a receiver 1010, a transmitter 1015, and a communications manager 1020. The communications manager 1020 can be implemented, at least in part, by one or both of a modem and a processor. Each of these components may be in communication with one another (for example, via one or more buses).

The receiver 1010 may provide a means for obtaining (for example, receiving, determining, identifying) information such as user data, control information, or any combination thereof (for example, I/Q samples, symbols, packets, protocol data units, service data units) associated with various channels (for example, control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (for example, electrical, fiber optic) interfaces, wireless interfaces, or any combination thereof.

The transmitter 1015 may provide a means for outputting (for example, transmitting, providing, conveying, sending) information generated by other components of the device 1005. For example, the transmitter 1015 may output information such as user data, control information, or any combination thereof (for example, I/Q samples, symbols, packets, protocol data units, service data units) associated with various channels (for example, control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (for example, electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of determining sub-band sizes for CSI reporting based on antenna port configuration adaptation. For example, the communications manager 1020 may include an antenna port configuration update component 1025, a reference signal transmission component 1030, a CSI report component 1035, or any combination thereof. In some examples, the communications manager 1020, or various components thereof, may be configured to perform various operations (for example, receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations associated with sub-band size determination for CSI reporting.

The communications manager 1020 may support wireless communications at a network entity in accordance with examples as disclosed herein. The antenna port configuration update component 1025 may be configured as or otherwise support a means for transmitting a control signal indicating an updated antenna port configuration for the network entity. The reference signal transmission component 1030 may be configured as or otherwise support a means for transmitting a set of multiple reference signals based on the updated antenna port configuration and on an association between the updated antenna port configuration and a sub-band size for a CSI report. The CSI report component 1035 may be configured as or otherwise support a means for receiving the CSI report including CSI measurements, the CSI measurements based on the sub-band size and the set of multiple reference signals.

Figure 11:
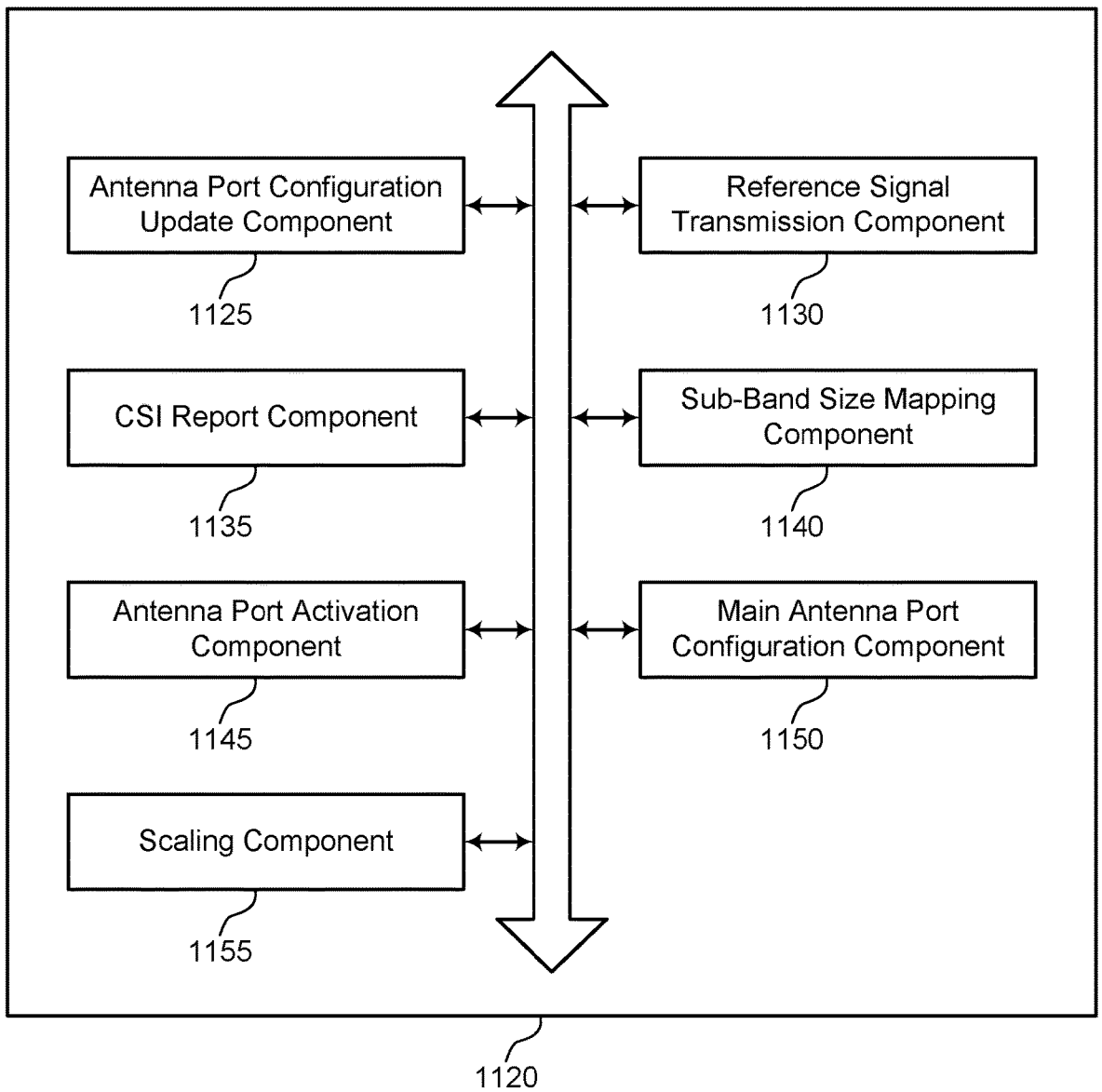
FIG. 11 shows a block diagram of a communications manager that supports determining a sub-band size for CSI reporting based on an active antenna port configuration in accordance with one or more aspects of the present disclosure.

FIG. 11 shows a block diagram of a communications manager 1120 that supports determining a sub-band size for CSI reporting based on an active antenna port configuration in accordance with one or more aspects of the present disclosure. The communications manager 1120, or various components thereof, may be an example of means for performing various aspects of sub-band sizes for CSI reporting based on antenna port configuration adaptation. For example, the communications manager 1120 may include an antenna port configuration update component 1125, a reference signal transmission component 1130, a CSI report component 1135, a sub-band size mapping component 1140, an antenna port activation component 1145, a main antenna port configuration component 1150, a scaling component 1155, or any combination thereof. Each of these components may communicate, directly or indirectly, with one another (for example, via one or more buses) which may include communications within a protocol layer of a protocol stack, communications associated with a logical channel of a protocol stack (for example, between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The antenna port configuration update component 1125 may be configured as or otherwise support a means for transmitting a control signal indicating an updated antenna port configuration for the network entity. The reference signal transmission component 1130 may be configured as or otherwise support a means for transmitting a set of multiple reference signals based on the updated antenna port configuration and on an association between the updated antenna port configuration and a sub-band size for a CSI report. The CSI report component 1135 may be configured as or otherwise support a means for receiving the CSI report including CSI measurements, the CSI measurements based on the sub-band size and the set of multiple reference signals.

In some examples, the sub-band size mapping component 1140 may be configured as or otherwise support a means for transmitting a second control signal configuring a mapping from a set of multiple antenna port quantities to a set of multiple respective sub-band sizes. The association between the updated antenna port configuration and the sub-band size may be based on the mapping.

In some examples, the second control signal configures a first mapping from the set of multiple antenna port quantities to a first set of multiple respective sub-band sizes for PMI reporting, a second mapping from the set of multiple antenna port quantities to a second set of multiple respective sub-band sizes for CQI reporting, or both. In some examples, the CSI report includes PMI information according to the first set of multiple respective sub-band sizes, CQI information according to the second set of multiple respective sub-band sizes, or both. In some examples, the second control signal includes an RRC signal.

In some examples, the network entity is configured with a set of multiple antenna port configurations including a main antenna port configuration and one or more secondary antenna port configurations, and the sub-band size mapping component 1140 may be configured as or otherwise support a means for transmitting a second control signal configuring a mapping from the main antenna port configuration to a main sub-band size and from the one or more secondary antenna port configurations to a secondary sub-band size. The association between the updated antenna port configuration and the sub-band size may be based on the mapping.

In some examples, the second control signal configures a first mapping from the main antenna port configuration to a first main sub-band size for PMI reporting and from the one or more secondary antenna port configurations to a first secondary sub-band size for the PMI reporting, a second mapping from the main antenna port configuration to a second main sub-band size for CQI reporting and from the one or more secondary antenna port configurations to a second secondary sub-band size for the CQI reporting, or both. In some examples, the CSI report includes PMI information according to the first main sub-band size and the first secondary sub-band size, CQI information according to the second main sub-band size and the second secondary sub-band size, or both. In some examples, the second control signal includes an RRC signal.

In some examples, the antenna port activation component 1145 may be configured as or otherwise support a means for updating a quantity of active antenna ports for the network entity from a first quantity of antenna ports to a second quantity of antenna ports. The updated antenna port configuration may indicate the second quantity of antenna ports.

In some examples, the main antenna port configuration component 1150 may be configured as or otherwise support a means for updating a main antenna port configuration for the network entity from a first antenna port configuration to a second antenna port configuration. The updated antenna port configuration may indicate the second antenna port configuration.

In some examples, the sub-band size mapping component 1140 may be configured as or otherwise support a means for transmitting a second control signal configuring a first mapping from an antenna port quantity to a respective sub-band size. In some examples, the scaling component 1155 may be configured as or otherwise support a means for determining an additional mapping from one or more additional antenna port quantities to one or more additional respective sub-band sizes based on the first mapping and a scaling operation. The association between the updated antenna port configuration and the sub-band size may be based on the first mapping, the additional mapping, or both. In some examples, the second control signal further configures the scaling operation.

In some examples, the control signal includes a DCI signal, a MAC-CE, or both.

Figure 12:
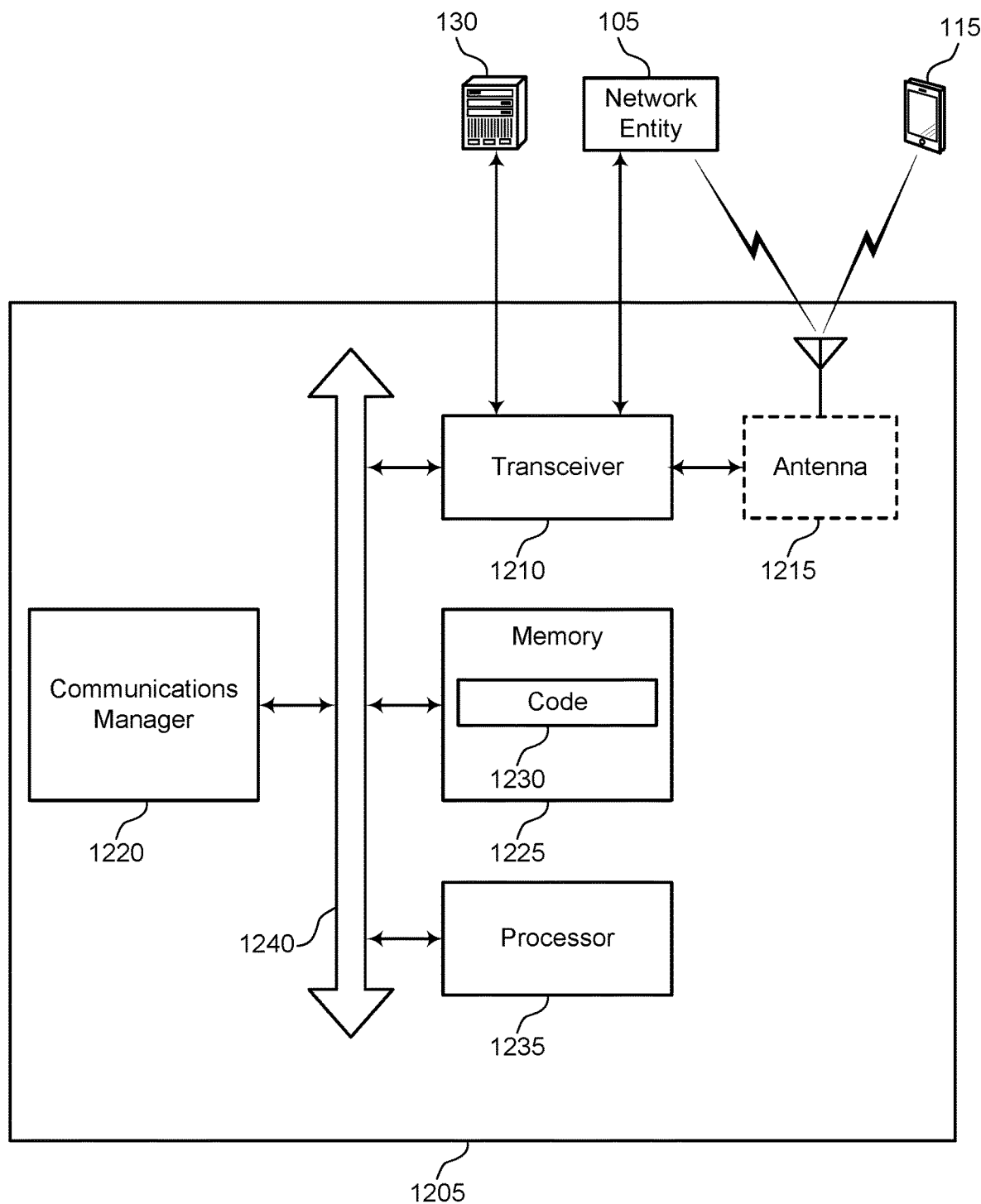
FIG. 12 shows a diagram of a system including a device that supports determining a sub-band size for CSI reporting based on an active antenna port configuration in accordance with one or more aspects of the present disclosure.

FIG. 12 shows a diagram of a system including a device 1205 that supports determining a sub-band size for CSI reporting based on an active antenna port configuration in accordance with one or more aspects of the present disclosure. The device 1205 may be an example of or include the components of a device 905, a device 1005, or a network entity 105. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (for example, operatively, communicatively, functionally, electronically, electrically) via one or more buses (for example, a bus 1240).

The transceiver 1210 may support bi-directional communications via wired links, wireless links, or both. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (for example, concurrently). The transceiver 1210 may also include a modem to modulate signals, to provide the modulated signals for transmission (for example, by one or more antennas 1215, by a wired transmitter), to receive modulated signals (for example, from one or more antennas 1215, from a wired receiver), and to demodulate signals. In some examples, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some examples, the transceiver 1210 may include or be configured for coupling with one or more processors or memory components that are operable to perform or support operations based on received or obtained information or signals, or to generate information or other signals for transmission or other outputting, or any combination thereof. In some examples, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (for example, a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions associated with sub-band size determination for CSI reporting. The code 1230 may be stored in a non-transitory computer-readable medium such as system memory or another type of memory. In some implementations, the code 1230 may not be directly executable by the processor 1235 but may cause a computer (for example, when compiled and executed) to perform functions associated with sub-band size determination for CSI reporting. In some implementations, the memory 1225 may contain, among other things, a BIOS which may control basic hardware or software operation such as the interaction with peripheral components or devices.

The processor 1235 may include an intelligent hardware device (for example, a general-purpose processor, a DSP, an ASIC, a CPU, an FPGA, a microcontroller, a programmable logic device, discrete gate or transistor logic, a discrete hardware component, or any combination thereof). In some implementations, the processor 1235 may be configured to operate a memory array using a memory controller. In some other implementations, a memory controller may be integrated into the processor 1235. The processor 1235 may be configured to execute computer-readable instructions stored in a memory (for example, the memory 1225) to cause the device 1205 to perform various functions (for example, functions or tasks supporting determining sub-band sizes for CSI reporting based on antenna port configuration adaptation). For example, the device 1205 or a component of the device 1205 may include a processor 1235 and memory 1225 coupled with the processor 1235, the processor 1235 and memory 1225 configured to perform various functions associated with sub-band size determination for CSI reporting. The processor 1235 may be an example of a cloud-computing platform (for example, one or more physical nodes and supporting software such as operating systems, virtual machines, or container instances) that may host the functions (for example, by executing code 1230) to perform the functions of the device 1205. The processor 1235 may be any one or more suitable processors capable of executing scripts or instructions of one or more software programs stored in the device 1205 (such as within the memory 1225). In some examples, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205 and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some examples, the one or more interfaces may refer to an interface between the processing system of the chip or modem and a transmitter, such that the device 1205 may transmit information output from the chip or modem. Additionally, or alternatively, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (for example, within) a protocol layer of a protocol stack. In some examples, a bus 1240 may support communications associated with a logical channel of a protocol stack (for example, between protocol layers of a protocol stack), which may include communications performed within a component of the device 1205, or between different components of the device 1205 that may be co-located or located in different locations (for example, and the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (for example, via one or more wired or wireless backhaul links). For example, the communications manager 1220 may manage the transfer of data communications for client devices, such as one or more UEs 115. In some examples, the communications manager 1220 may manage communications with other network entities 105 and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for transmitting a control signal indicating an updated antenna port configuration for the network entity. The communications manager 1220 may be configured as or otherwise support a means for transmitting a set of multiple reference signals based on the updated antenna port configuration and on an association between the updated antenna port configuration and a sub-band size for a CSI report. The communications manager 1220 may be configured as or otherwise support a means for receiving the CSI report including CSI measurements, the CSI measurements based on the sub-band size and the set of multiple reference signals.

By including or configuring the communications manager 1220, the device 1205 may support techniques for improved communication reliability, reduced latency associated with updating CSI reporting granularity, reduced power consumption, or any combination thereof.

In some examples, the communications manager 1220 may be configured to perform various operations (for example, receiving, obtaining, monitoring, outputting, transmitting) using or otherwise in cooperation with the transceiver 1210, the one or more antennas 1215 (for example, if applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of determining sub-band sizes for CSI reporting based on antenna port configuration adaptation, or the processor 1235 and the memory 1225 may be otherwise configured to perform or support such operations.

Figure 13:
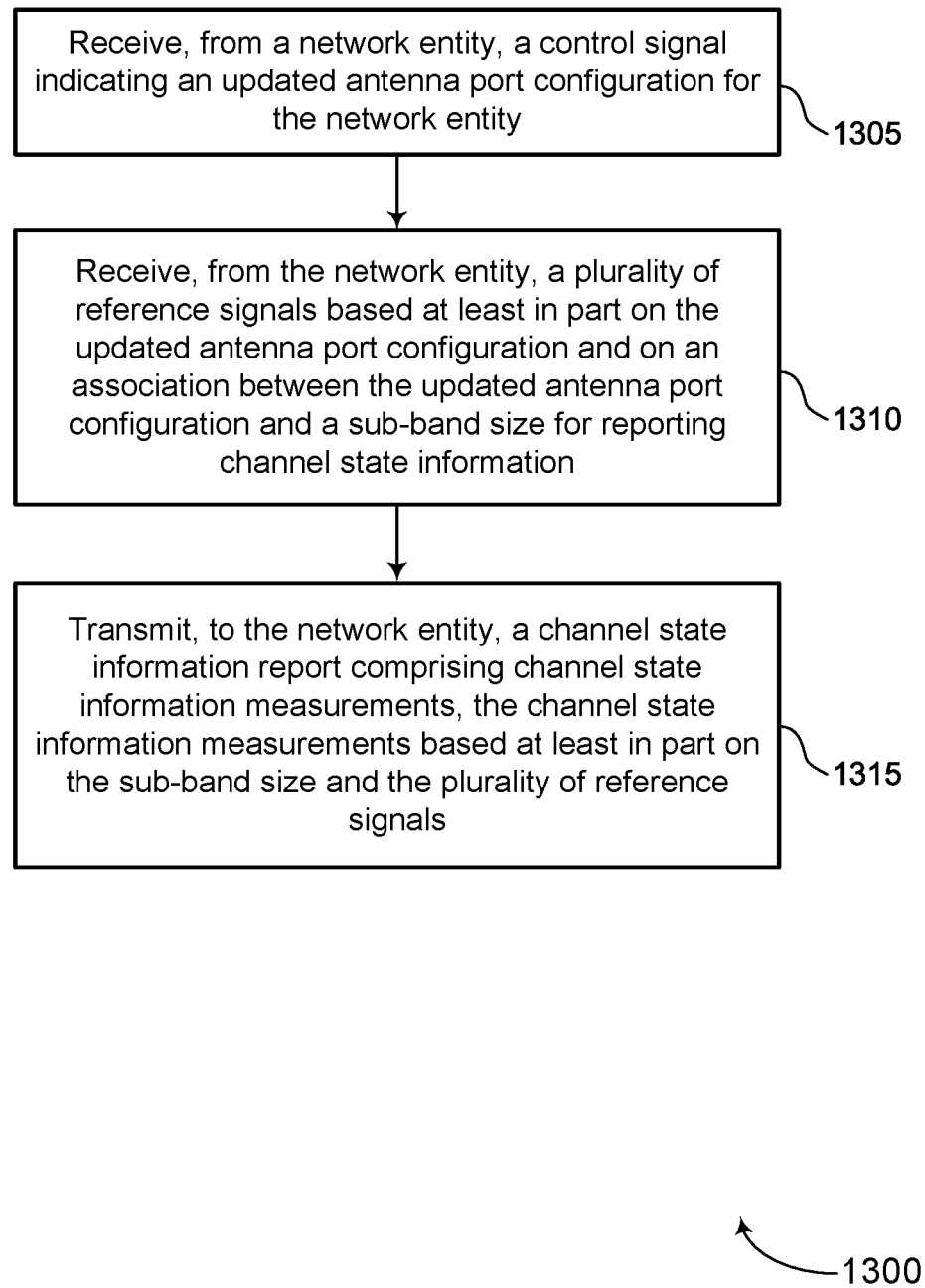
FIGS. 13-17 show flowcharts illustrating methods that support determining a sub-band size for CSI reporting based on an active antenna port configuration in accordance with one or more aspects of the present disclosure.

FIG. 13 shows a flowchart illustrating a method 1300 that supports determining a sub-band size for CSI reporting based on an active antenna port configuration in accordance with one or more aspects of the present disclosure. The operations of the method 1300 may be implemented by a UE or its components. For example, the operations of the method 1300 may be performed by a UE 115 as described with reference to FIGS. 1-8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, a control signal indicating an updated antenna port configuration for the network entity. The operations of 1305 may be performed in accordance with examples as disclosed herein. In some examples, aspects of the operations of 1305 may be performed by an antenna port configuration update component 725 as described with reference to FIG. 7.

At 1310, the method may include receiving, from the network entity, a set of multiple reference signals based on the updated antenna port configuration and on an association between the updated antenna port configuration and a sub-band size for reporting CSI. The operations of 1310 may be performed in accordance with examples as disclosed herein. In some examples, aspects of the operations of 1310 may be performed by a reference signal measuring component 730 as described with reference to FIG. 7.

At 1315, the method may include transmitting, to the network entity, a CSI report including CSI measurements, the CSI measurements based on the sub-band size and the set of multiple reference signals. The operations of 1315 may be performed in accordance with examples as disclosed herein. In some examples, aspects of the operations of 1315 may be performed by a CSI reporting component 735 as described with reference to FIG. 7.

Figure 14:
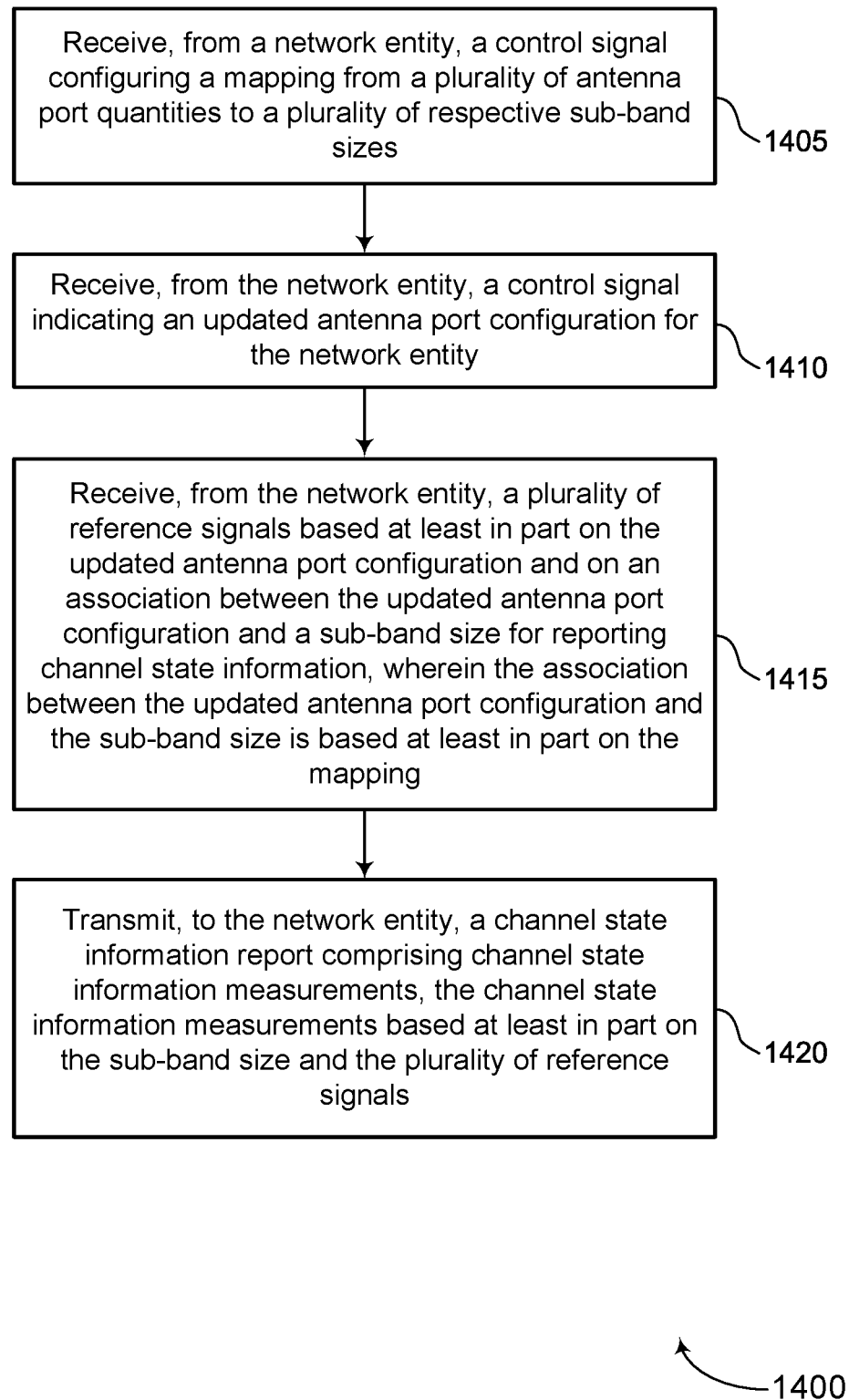

FIG. 14 shows a flowchart illustrating a method 1400 that supports determining a sub-band size for CSI reporting based on an active antenna port configuration in accordance with one or more aspects of the present disclosure. The operations of the method 1400 may be implemented by a UE or its components. For example, the operations of the method 1400 may be performed by a UE 115 as described with reference to FIGS. 1-8. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, a control signal configuring a mapping from a set of multiple antenna port quantities to a set of multiple respective sub-band sizes. The operations of 1405 may be performed in accordance with examples as disclosed herein. In some examples, aspects of the operations of 1405 may be performed by a sub-band size mapping component 740 as described with reference to FIG. 7.

At 1410, the method may include receiving, from the network entity, a control signal indicating an updated antenna port configuration for the network entity. The operations of 1410 may be performed in accordance with examples as disclosed herein. In some examples, aspects of the operations of 1410 may be performed by an antenna port configuration update component 725 as described with reference to FIG. 7.

At 1415, the method may include receiving, from the network entity, a set of multiple reference signals based on the updated antenna port configuration and on an association between the updated antenna port configuration and a sub-band size for reporting CSI. The association between the updated antenna port configuration and the sub-band size may be based on the mapping. The operations of 1415 may be performed in accordance with examples as disclosed herein. In some examples, aspects of the operations of 1415 may be performed by a reference signal measuring component 730 as described with reference to FIG. 7.

At 1420, the method may include transmitting, to the network entity, a CSI report including CSI measurements, the CSI measurements based on the sub-band size and the set of multiple reference signals. The operations of 1420 may be performed in accordance with examples as disclosed herein. In some examples, aspects of the operations of 1420 may be performed by a CSI reporting component 735 as described with reference to FIG. 7.

Figure 15:
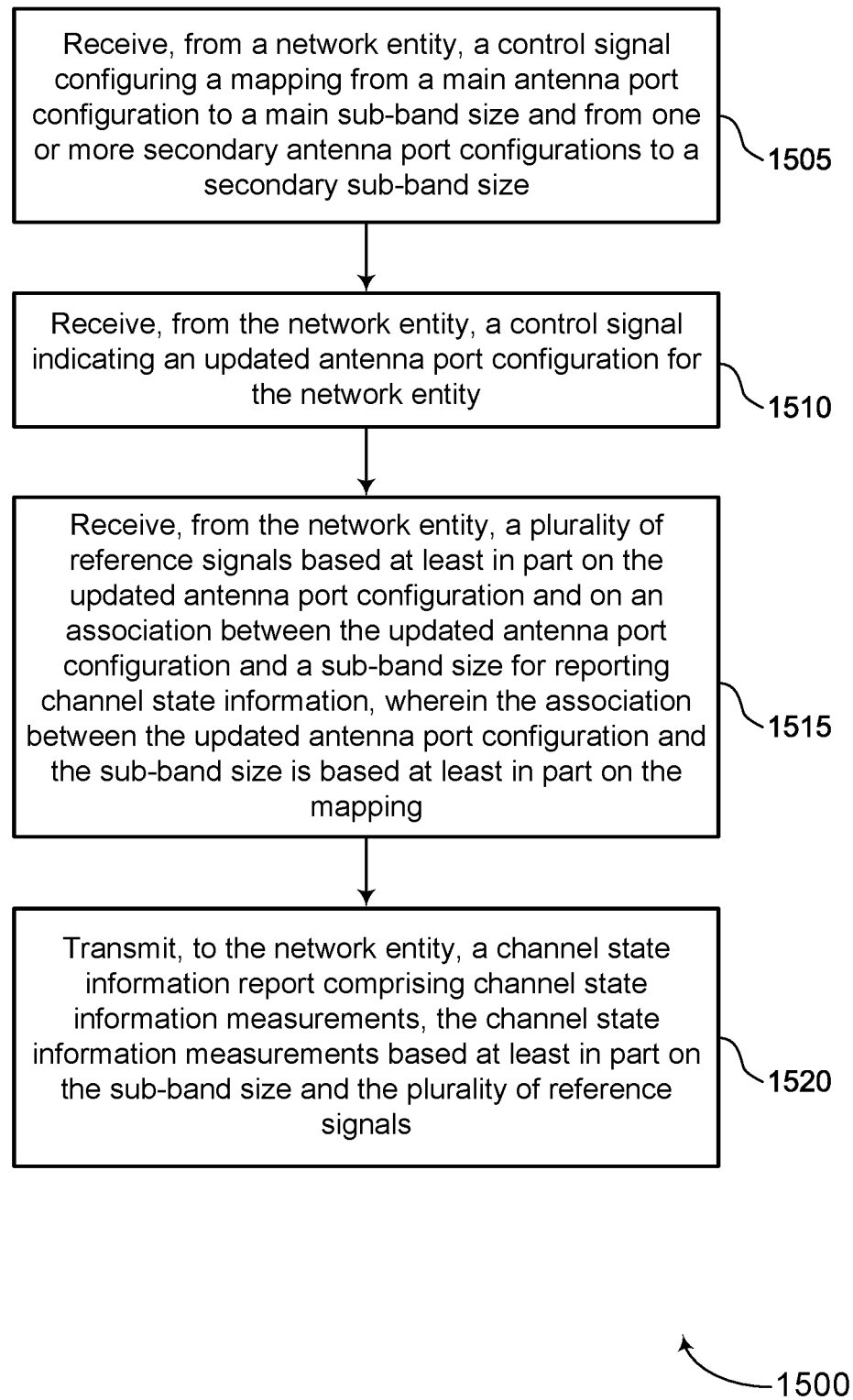

FIG. 15 shows a flowchart illustrating a method 1500 that supports determining a sub-band size for CSI reporting based on an active antenna port configuration in accordance with one or more aspects of the present disclosure. The operations of the method 1500 may be implemented by a UE or its components. For example, the operations of the method 1500 may be performed by a UE 115 as described with reference to FIGS. 1-8. In some examples, a UE may execute a set of instructions to control the functional elements of the UE to perform the described functions. Additionally, or alternatively, the UE may perform aspects of the described functions using special-purpose hardware.

At 1505, the method may include receiving, from a network entity, a control signal configuring a mapping from a main antenna port configuration to a main sub-band size and from one or more secondary antenna port configurations to a secondary sub-band size. The operations of 1505 may be performed in accordance with examples as disclosed herein. In some examples, aspects of the operations of 1505 may be performed by a sub-band size mapping component 740 as described with reference to FIG. 7.

At 1510, the method may include receiving, from the network entity, a control signal indicating an updated antenna port configuration for the network entity. The operations of 1510 may be performed in accordance with examples as disclosed herein. In some examples, aspects of the operations of 1510 may be performed by an antenna port configuration update component 725 as described with reference to FIG. 7.

At 1515, the method may include receiving, from the network entity, a set of multiple reference signals based on the updated antenna port configuration and on an association between the updated antenna port configuration and a sub-band size for reporting CSI. The association between the updated antenna port configuration and the sub-band size may be based on the mapping. The operations of 1515 may be performed in accordance with examples as disclosed herein. In some examples, aspects of the operations of 1515 may be performed by a reference signal measuring component 730 as described with reference to FIG. 7.

At 1520, the method may include transmitting, to the network entity, a CSI report including CSI measurements, the CSI measurements based on the sub-band size and the set of multiple reference signals. The operations of 1520 may be performed in accordance with examples as disclosed herein. In some examples, aspects of the operations of 1520 may be performed by a CSI reporting component 735 as described with reference to FIG. 7.

Figure 16:
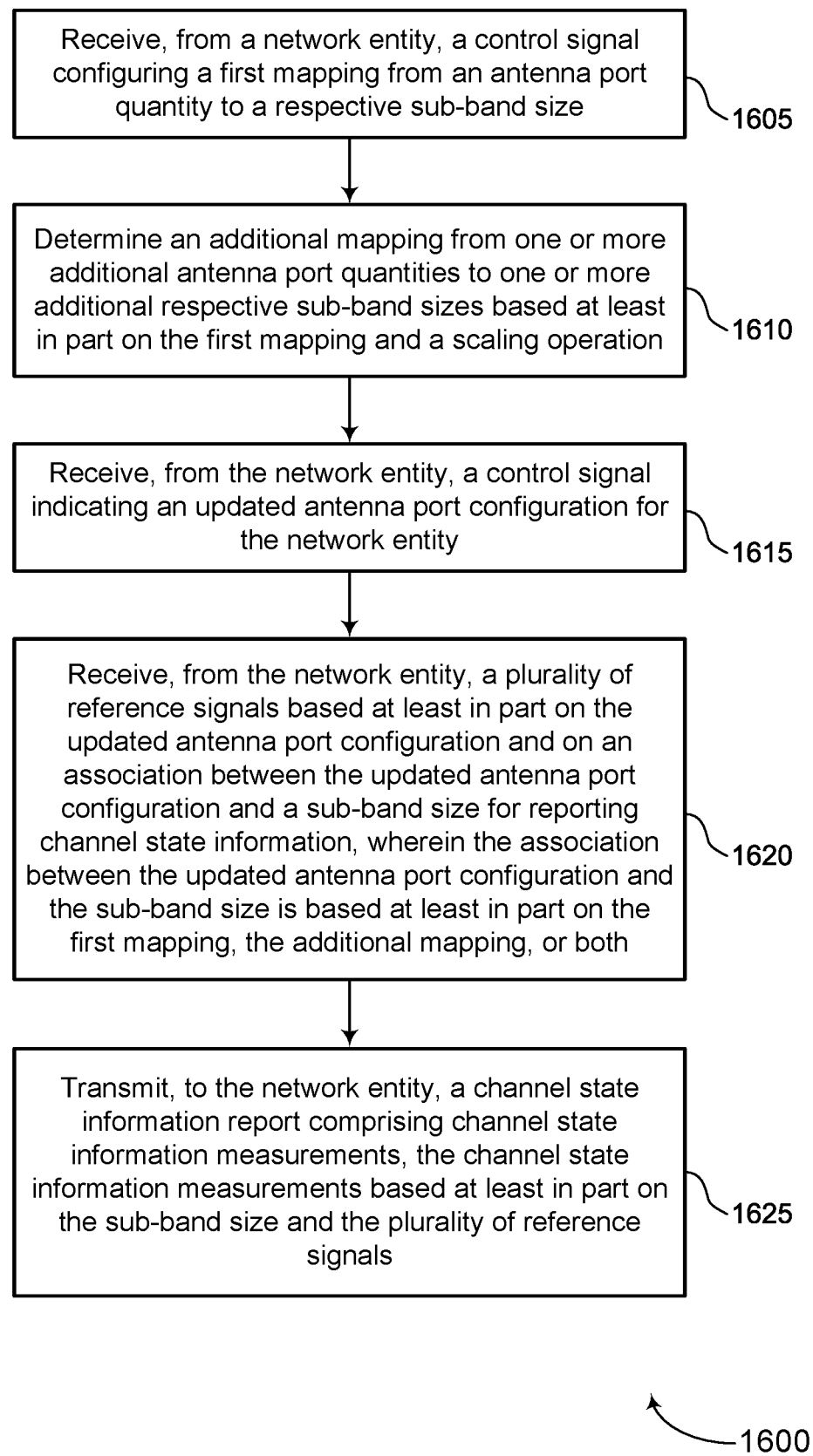

FIG. 16 shows a flowchart illustrating a method 1600 that supports determining a sub-band size for CSI reporting based on an active antenna port configuration in accordance with one or more aspects of the present disclosure. The operations of the method 1600 may be implemented by a UE or its components. For example, the operations of the method 1600 may be performed by a UE 115 as described with reference to FIGS. 1-8. In some examples, a UE may execute a set of instructions to control the functional elements of the UE to perform the described functions. Additionally, or alternatively, the UE may perform aspects of the described functions using special-purpose hardware.

At 1605, the method may include receiving, from a network entity, a control signal configuring a first mapping from an antenna port quantity to a respective sub-band size. The operations of 1605 may be performed in accordance with examples as disclosed herein. In some examples, aspects of the operations of 1605 may be performed by a sub-band size mapping component 740 as described with reference to FIG. 7.

At 1610, the method may include determining an additional mapping from one or more additional antenna port quantities to one or more additional respective sub-band sizes based on the first mapping and a scaling operation. The operations of 1610 may be performed in accordance with examples as disclosed herein. In some examples, aspects of the operations of 1610 may be performed by a scaling component 745 as described with reference to FIG. 7.

At 1615, the method may include receiving, from the network entity, a control signal indicating an updated antenna port configuration for the network entity. The operations of 1615 may be performed in accordance with examples as disclosed herein. In some examples, aspects of the operations of 1615 may be performed by an antenna port configuration update component 725 as described with reference to FIG. 7.

At 1620, the method may include receiving, from the network entity, a set of multiple reference signals based on the updated antenna port configuration and on an association between the updated antenna port configuration and a sub-band size for reporting CSI. The association between the updated antenna port configuration and the sub-band size may be based on the first mapping, the additional mapping, or both. The operations of 1620 may be performed in accordance with examples as disclosed herein. In some examples, aspects of the operations of 1620 may be performed by a reference signal measuring component 730 as described with reference to FIG. 7.

At 1625, the method may include transmitting, to the network entity, a CSI report including CSI measurements, the CSI measurements based on the sub-band size and the set of multiple reference signals. The operations of 1625 may be performed in accordance with examples as disclosed herein.

In some examples, aspects of the operations of 1625 may be performed by a CSI reporting component 735 as described with reference to FIG. 7.

Figure 17:
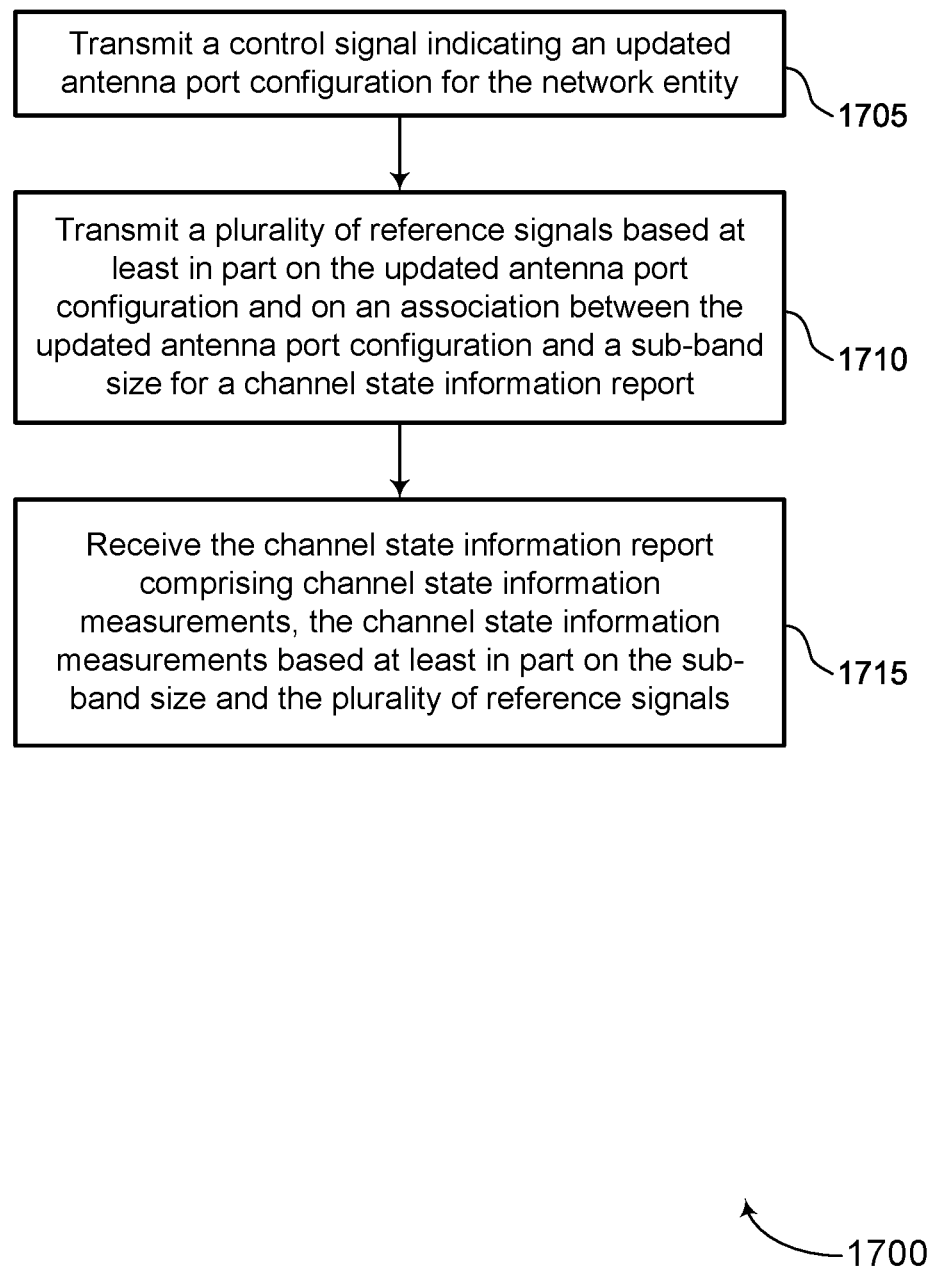

FIG. 17 shows a flowchart illustrating a method 1700 that supports determining a sub-band size for CSI reporting based on an active antenna port configuration in accordance with one or more aspects of the present disclosure. The operations of the method 1700 may be implemented by a network entity or its components. For example, the operations of the method 1700 may be performed by a network entity as described with reference to FIGS. 1-4 and 9-12. In some examples, a network entity may execute a set of instructions to control the functional elements of the network entity to perform the described functions. Additionally, or alternatively, the network entity may perform aspects of the described functions using special-purpose hardware.

At 1705, the method may include transmitting a control signal indicating an updated antenna port configuration for the network entity. The operations of 1705 may be performed in accordance with examples as disclosed herein. In some examples, aspects of the operations of 1705 may be performed by an antenna port configuration update component 1125 as described with reference to FIG. 11.

At 1710, the method may include transmitting a set of multiple reference signals based on the updated antenna port configuration and on an association between the updated antenna port configuration and a sub-band size for a CSI report. The operations of 1710 may be performed in accordance with examples as disclosed herein. In some examples, aspects of the operations of 1710 may be performed by a reference signal transmission component 1130 as described with reference to FIG. 11.

At 1715, the method may include receiving the CSI report including CSI measurements, the CSI measurements based on the sub-band size and the set of multiple reference signals. The operations of 1715 may be performed in accordance with examples as disclosed herein. In some examples, aspects of the operations of 1715 may be performed by a CSI report component 1135 as described with reference to FIG. 11.

The following provides an overview of aspects of the present disclosure:

Aspect 1: A method for wireless communications at a UE, comprising: receiving, from a network entity, a control signal indicating an updated antenna port configuration for the network entity; receiving, from the network entity, a plurality of reference signals based at least in part on the updated antenna port configuration and on an association between the updated antenna port configuration and a sub-band size for reporting CSI; and transmitting, to the network entity, a CSI report comprising CSI measurements, the CSI measurements based at least in part on the sub-band size and the plurality of reference signals.

Aspect 2: The method of aspect 1, further comprising: receiving, from the network entity, a second control signal configuring a mapping from a plurality of antenna port quantities to a plurality of respective sub-band sizes, wherein the association between the updated antenna port configuration and the sub-band size is based at least in part on the mapping.

Aspect 3: The method of aspect 2, wherein the second control signal configures a first mapping from the plurality of antenna port quantities to a first plurality of respective sub-band sizes for PMI reporting, a second mapping from the plurality of antenna port quantities to a second plurality of respective sub-band sizes for CQI reporting, or both; and the CSI report comprises PMI information according to the first plurality of respective sub-band sizes, CQI information according to the second plurality of respective sub-band sizes, or both.

Aspect 4: The method of any of aspects 2 through 3, wherein the second control signal comprises an RRC signal.

Aspect 5: The method of aspect 1, wherein the UE is configured with a plurality of antenna port configurations for the network entity comprising a main antenna port configuration and one or more secondary antenna port configurations, the method further comprising: receiving, from the network entity, a second control signal configuring a mapping from the main antenna port configuration to a main sub-band size and from the one or more secondary antenna port configurations to a secondary sub-band size, wherein the association between the updated antenna port configuration and the sub-band size is based at least in part on the mapping.

Aspect 6: The method of aspect 5, wherein the second control signal configures a first mapping from the main antenna port configuration to a first main sub-band size for PMI reporting and from the one or more secondary antenna port configurations to a first secondary sub-band size for the PMI reporting, a second mapping from the main antenna port configuration to a second main sub-band size for CQI reporting and from the one or more secondary antenna port configurations to a second secondary sub-band size for the CQI reporting, or both; and the CSI report comprises PMI information according to the first main sub-band size and the first secondary sub-band size, CQI information according to the second main sub-band size and the second secondary sub-band size, or both.

Aspect 7: The method of any of aspects 5 through 6, wherein the second control signal comprises an RRC signal.

Aspect 8: The method of any of aspects 1 through 7, wherein the updated antenna port configuration indicates an updated quantity of active antenna ports for the network entity, an updated main antenna port configuration for the network entity, or both.

Aspect 9: The method of any of aspects 1 or 8, further comprising: receiving, from the network entity, a second control signal configuring a first mapping from an antenna port quantity to a respective sub-band size; and determining an additional mapping from one or more additional antenna port quantities to one or more additional respective sub-band sizes based at least in part on the first mapping and a scaling operation, wherein the association between the updated antenna port configuration and the sub-band size is based at least in part on the first mapping, the additional mapping, or both.

Aspect 10: The method of aspect 9, wherein the second control signal further configures the scaling operation.

Aspect 11: The method of any of aspects 1 through 10, wherein the control signal comprises a DCI signal, a MAC-CE, or both.

Aspect 12: A method for wireless communications at a network entity, comprising: transmitting a control signal indicating an updated antenna port configuration for the network entity; transmitting a plurality of reference signals based at least in part on the updated antenna port configuration and on an association between the updated antenna port configuration and a sub-band size for a CSI report; and receiving the CSI report comprising CSI measurements, the CSI measurements based at least in part on the sub-band size and the plurality of reference signals.

Aspect 13: The method of aspect 12, further comprising: transmitting a second control signal configuring a mapping from a plurality of antenna port quantities to a plurality of respective sub-band sizes, wherein the association between the updated antenna port configuration and the sub-band size is based at least in part on the mapping.

Aspect 14: The method of aspect 13, wherein the second control signal configures a first mapping from the plurality of antenna port quantities to a first plurality of respective sub-band sizes for PMI reporting, a second mapping from the plurality of antenna port quantities to a second plurality of respective sub-band sizes for CQI reporting, or both; and the CSI report comprises PMI information according to the first plurality of respective sub-band sizes, CQI information according to the second plurality of respective sub-band sizes, or both.

Aspect 15: The method of any of aspects 13 through 14, wherein the second control signal comprises an RRC signal.

Aspect 16: The method of aspect 12, wherein the network entity is configured with a plurality of antenna port configurations comprising a main antenna port configuration and one or more secondary antenna port configurations, the method further comprising: transmitting a second control signal configuring a mapping from the main antenna port configuration to a main sub-band size and from the one or more secondary antenna port configurations to a secondary sub-band size, wherein the association between the updated antenna port configuration and the sub-band size is based at least in part on the mapping.

Aspect 17: The method of aspect 16, wherein the second control signal configures a first mapping from the main antenna port configuration to a first main sub-band size for PMI reporting and from the one or more secondary antenna port configurations to a first secondary sub-band size for the PMI reporting, a second mapping from the main antenna port configuration to a second main sub-band size for CQI reporting and from the one or more secondary antenna port configurations to a second secondary sub-band size for the CQI reporting, or both; and the CSI report comprises PMI information according to the first main sub-band size and the first secondary sub-band size, CQI information according to the second main sub-band size and the second secondary sub-band size, or both.

Aspect 18: The method of any of aspects 16 through 17, wherein the second control signal comprises an RRC signal.

Aspect 19: The method of any of aspects 12 through 18, further comprising: updating a quantity of active antenna ports for the network entity from a first quantity of antenna ports to a second quantity of antenna ports, wherein the updated antenna port configuration indicates the second quantity of antenna ports.

Aspect 20: The method of any of aspects 12 through 19, further comprising: updating a main antenna port configuration for the network entity from a first antenna port configuration to a second antenna port configuration, wherein the updated antenna port configuration indicates the second antenna port configuration.

Aspect 21: The method of any of aspects 12, 19, or 20, further comprising: transmitting a second control signal configuring a first mapping from an antenna port quantity to a respective sub-band size; and determining an additional mapping from one or more additional antenna port quantities to one or more additional respective sub-band sizes based at least in part on the first mapping and a scaling operation, wherein the association between the updated antenna port configuration and the sub-band size is based at least in part on the first mapping, the additional mapping, or both.

Aspect 22: The method of aspect 21, wherein the second control signal further configures the scaling operation.

Aspect 23: The method of any of aspects 12 through 22, wherein the control signal comprises a DCI signal, a MAC-CE, or both.

Aspect 24: An apparatus for wireless communications at a UE, comprising: a processor; and memory coupled with the processor and storing instructions executable by the processor to cause the apparatus to perform a method of any of aspects 1 through 11.

Aspect 25: An apparatus for wireless communications at a UE, comprising at least one means for performing a method of any of aspects 1 through 11.

Aspect 26: A non-transitory computer-readable medium storing code for wireless communications at a UE, the code comprising instructions executable by a processor to perform a method of any of aspects 1 through 11.

Aspect 27: An apparatus for wireless communications at a network entity, comprising: a processor; and memory coupled with the processor and storing instructions executable by the processor to cause the apparatus to perform a method of any of aspects 12 through 23.

Aspect 28: An apparatus for wireless communications at a network entity, comprising at least one means for performing a method of any of aspects 12 through 23.

Aspect 29: A non-transitory computer-readable medium storing code for wireless communications at a network entity, the code comprising instructions executable by a processor to perform a method of any of aspects 12 through 23.

It should be noted that the methods describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions associated with sub-band size determination for CSI reporting. A general-purpose processor may be a microprocessor but, in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions associated with sub-band size determination for CSI reporting may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and can include calculating, computing, processing, deriving, investigating, looking up (such as via looking up in a table, a database or another data structure), or ascertaining, among other examples. Also, "determining" can include receiving (for example, receiving information) or accessing (for example, accessing data stored in memory), among further examples. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to a set of examples and designs but is to be accorded the broadest scope consistent with the principles and novel features disclosed herein.

What is claimed is:

1. A method for wireless communications at a user equipment (UE), comprising:
   receiving a control signal indicating an updated antenna port configuration for a network entity;
   receiving a plurality of reference signals in accordance with:
      the updated antenna port configuration, and
      an association between the updated antenna port configuration and a sub-band size for reporting channel state information; and
   transmitting a channel state information report comprising a plurality of channel state information measurements, each channel state information measurement of the plurality of channel state information measurements corresponding to the sub-band size for reporting the channel state information and one or more of the plurality of reference signals.

2. The method of claim 1, further comprising receiving a second control signal configuring a mapping from a plurality of antenna port quantities to a plurality of respective sub-band sizes for the network entity, the association between the updated antenna port configuration and the sub-band size being in accordance with the mapping.

3. The method of claim 2, wherein:
the second control signal configures a first mapping from the plurality of antenna port quantities to a first plurality of respective sub-band sizes for precoding matrix indicator reporting, a second mapping from the plurality of antenna port quantities to a second plurality of respective sub-band sizes for channel quality indicator reporting, or both; and
the channel state information report comprises precoding matrix indicator information according to the first plurality of respective sub-band sizes, channel quality indicator information according to the second plurality of respective sub-band sizes, or both.

4. The method of claim 2, wherein the second control signal comprises a radio resource control signal.

5. The method of claim 1, wherein the UE is configured with a plurality of antenna port configurations for the network entity comprising a main antenna port configuration and one or more secondary antenna port configurations, the method further comprising:
receiving a second control signal configuring a mapping from the main antenna port configuration to a main sub-band size and from the one or more secondary antenna port configurations to a secondary sub-band size for the network entity, the association between the updated antenna port configuration and the sub-band size being in accordance with the mapping.

6. The method of claim 5, wherein:
the second control signal configures a first mapping from the main antenna port configuration to a first main sub-band size for precoding matrix indicator reporting and from the one or more secondary antenna port configurations to a first secondary sub-band size for the precoding matrix indicator reporting, a second mapping from the main antenna port configuration to a second main sub-band size for channel quality indicator reporting and from the one or more secondary antenna port configurations to a second secondary sub-band size for the channel quality indicator reporting, or both; and
the channel state information report comprises precoding matrix indicator information according to the first main sub-band size and the first secondary sub-band size, channel quality indicator information according to the second main sub-band size and the second secondary sub-band size, or both.

7. The method of claim 5, wherein the second control signal comprises a radio resource control signal.

8. The method of claim 1, wherein the updated antenna port configuration indicates an updated quantity of active antenna ports for the network entity, an updated main antenna port configuration for the network entity, or both.

9. The method of claim 1, further comprising:
receiving a second control signal configuring a first mapping from an antenna port quantity to a respective sub-band size for the network entity; and
determining an additional mapping from one or more additional antenna port quantities to one or more additional respective sub-band sizes in accordance with the first mapping and a scaling operation, the association between the updated antenna port configuration and the sub-band size being in accordance with the first mapping, the additional mapping, or both.

10. The method of claim 9, wherein the second control signal further configures the scaling operation.

11. The method of claim 1, wherein the control signal comprises a downlink control information signal, a medium access control element, or both.

12. A method for wireless communications at a network entity, comprising:
transmitting a control signal indicating an updated antenna port configuration for the network entity;
transmitting a plurality of reference signals in accordance with:
the updated antenna port configuration, and
an association between the updated antenna port configuration and a sub-band size for a channel state information report; and
receiving the channel state information report comprising a plurality of channel state information measurements, each channel state information measurement of the plurality of channel state information measurements corresponding to the sub-band size for the channel state information report and one or more of the plurality of reference signals.

13. The method of claim 12, further comprising transmitting a second control signal configuring a mapping from a plurality of antenna port quantities to a plurality of respective sub-band sizes for the network entity, the association between the updated antenna port configuration and the sub-band size being in accordance with the mapping.

14. The method of claim 13, wherein:
the second control signal configures a first mapping from the plurality of antenna port quantities to a first plurality of respective sub-band sizes for precoding matrix indicator reporting, a second mapping from the plurality of antenna port quantities to a second plurality of respective sub-band sizes for channel quality indicator reporting, or both; and
the channel state information report comprises precoding matrix indicator information according to the first plurality of respective sub-band sizes, channel quality indicator information according to the second plurality of respective sub-band sizes, or both.

15. The method of claim 13, wherein the second control signal comprises a radio resource control signal.

16. The method of claim 12, wherein the network entity is configured with a plurality of antenna port configurations comprising a main antenna port configuration and one or more secondary antenna port configurations, the method further comprising:
transmitting a second control signal configuring a mapping from the main antenna port configuration to a main sub-band size and from the one or more secondary antenna port configurations to a secondary sub-band size for the network entity, the association between the updated antenna port configuration and the sub-band size being in accordance with the mapping.

17. The method of claim 16, wherein:
the second control signal configures a first mapping from the main antenna port configuration to a first main sub-band size for precoding matrix indicator reporting and from the one or more secondary antenna port configurations to a first secondary sub-band size for the precoding matrix indicator reporting, a second mapping from the main antenna port configuration to a second main sub-band size for channel quality indicator reporting and from the one or more secondary antenna port configurations to a second secondary sub-band size for the channel quality indicator reporting, or both; and
the channel state information report comprises precoding matrix indicator information according to the first main sub-band size and the first secondary sub-band size, channel quality indicator information according to the second main sub-band size and the second secondary sub-band size, or both.

18. The method of claim 16, wherein the second control signal comprises a radio resource control signal.

19. The method of claim 12, further comprising updating a quantity of active antenna ports for the network entity from a first quantity of antenna ports to a second quantity of antenna ports, the updated antenna port configuration indicating the second quantity of antenna ports.

20. The method of claim 12, further comprising updating a main antenna port configuration for the network entity from a first antenna port configuration to a second antenna port configuration, the updated antenna port configuration indicating the second antenna port configuration.

21. The method of claim 12, further comprising:
transmitting a second control signal configuring a first mapping from an antenna port quantity to a respective sub-band size for the network entity; and
determining an additional mapping from one or more additional antenna port quantities to one or more additional respective sub-band sizes in accordance with the first mapping and a scaling operation, the association between the updated antenna port configuration and the sub-band size being in accordance with the first mapping, the additional mapping, or both.

22. The method of claim 21, wherein the second control signal further configures the scaling operation.

23. The method of claim 12, wherein the control signal comprises a downlink control information signal, a medium access control element, or both.

24. A user equipment (UE), comprising:
a processing system that includes one or more processors and one or more memories that store code, the processing system configured to cause the UE to:
receive a control signal indicating an updated antenna port configuration for a network entity;
receive a plurality of reference signals in accordance with:
the updated antenna port configuration, and
an association between the updated antenna port configuration and a sub-band size for reporting channel state information; and
transmit a channel state information report comprising a plurality of channel state information measurements, each channel state information measurement of the plurality of channel state information measurements corresponding to the sub-band size for reporting the channel state information and one or more of the plurality of reference signals.

25. The UE of claim 24, wherein the processing system is further configured to cause the UE to receive a second control signal configuring a mapping from a plurality of antenna port quantities to a plurality of respective sub-band sizes for the network entity, the association between the updated antenna port configuration and the sub-band size being in accordance with the mapping.

26. The UE of claim 24, wherein the UE is configured with a plurality of antenna port configurations for the network entity comprising a main antenna port configuration and one or more secondary antenna port configurations, and the processing system is further configured to cause the UE to:
receive a second control signal configuring a mapping from the main antenna port configuration to a main sub-band size and from the one or more secondary antenna port configurations to a secondary sub-band size for the network entity, the association between the updated antenna port configuration and the sub-band size being in accordance with the mapping.

27. The UE of claim 24, wherein the processing system is further configured to cause the UE apparatus to:
receive a second control signal configuring a first mapping from an antenna port quantity to a respective sub-band size for the network entity; and
determine an additional mapping from one or more additional antenna port quantities to one or more additional respective sub-band sizes in accordance with the first mapping and a scaling operation, the association between the updated antenna port configuration and the sub-band size being in accordance with the first mapping, the additional mapping, or both.

28. A network entity, comprising:
a processing system that includes one or more processors and one or more memories that store code, the processing system configured to cause the network entity to:
transmit a control signal indicating an updated antenna port configuration for the network entity;
transmit a plurality of reference signals in accordance with:
the updated antenna port configuration, and
an association between the updated antenna port configuration and a sub-band size for a channel state information report; and
receive the channel state information report comprising a plurality of channel state information measurements, each channel state information measurement of the plurality of channel state information measurements corresponding to the sub-band size for the channel state information report and one or more of the plurality of reference signals.

29. The network entity of claim 28, wherein the processing system is further configured to cause the network entity to transmit a second control signal configuring a mapping from a plurality of antenna port quantities to a plurality of respective sub-band sizes for the network entity, the association between the updated antenna port configuration and the sub-band size being in accordance with the mapping.

30. The network entity of claim 28, wherein the network entity is configured with a plurality of antenna port configurations comprising a main antenna port configuration and one or more secondary antenna port configurations, and the processing system is further configured to cause the network entity to:
transmit a second control signal configuring a mapping from the main antenna port configuration to a main sub-band size and from the one or more secondary antenna port configurations to a secondary sub-band size for the network entity, the association between the updated antenna port configuration and the sub-band size being in accordance with the mapping.

* * * * *